(12) United States Patent
Tunli

(10) Patent No.: US 6,545,689 B1
(45) Date of Patent: Apr. 8, 2003

(54) METHOD AND SYSTEM FOR REVIEWING, EDITING AND ANALYZING VIDEO

(76) Inventor: Jan Tunli, Tromsogt, 10 H, 0565 Oslo (NO)

( * ) Notice: Subject to any disclaimer, the term of this patent is extended or adjusted under 35 U.S.C. 154(b) by 0 days.

(21) Appl. No.: 09/488,461

(22) Filed: Jan. 20, 2000

Related U.S. Application Data

(60) Provisional application No. 60/116,496, filed on Jan. 20, 1999.

(51) Int. Cl.[7] ................................................ G09G 5/00
(52) U.S. Cl. ...................................... 345/719; 345/763
(58) Field of Search ................................ 345/716–726, 345/709, 731, 763; 386/52; 348/722, 169; 463/3; 473/459, 407

(56) References Cited

U.S. PATENT DOCUMENTS

| | | | | |
|---|---|---|---|---|
| 5,769,713 A | * | 6/1998 | Katayama | 463/3 |
| 5,779,566 A | * | 7/1998 | Willens | 473/407 |
| 5,816,953 A | * | 10/1998 | Cleveland | 473/459 |
| 5,923,365 A | * | 7/1999 | Tamir et al. | 348/169 |
| 6,144,375 A | * | 11/2000 | Jain et al. | 345/302 |
| 6,289,167 B1 | * | 9/2001 | Boetje et al. | 386/52 |
| 6,353,461 B1 | * | 3/2002 | Shore et al. | 348/722 |

* cited by examiner

*Primary Examiner*—John Cabeca
*Assistant Examiner*—Tadesse Hailu
(74) *Attorney, Agent, or Firm*—Mintz, Levin, Cohn, Ferris, Glovsky and Popeo, P.C.

(57) ABSTRACT

A method and system for reviewing, editing and analyzing video comprising a computer system coupled to a plurality of video data players. The computer system capturing a plurality of video clips provided by the video data player in accordance with a predetermined video capture level. The plurality of captured video clips are further processed and arranged to generate statistical reports.

6 Claims, 23 Drawing Sheets

1704

| Selection possibilities | | |
|---|---|---|
| Team<br>⦿ Home team<br>○ Away team | Match time (Minutes)<br>From　　[00]<br>To　　　[00] | |
| Start attack<br>☐ Free kick<br>☐ Offside<br>☐ Throw-in<br>☐ Kick out<br>☐ Throw-in<br>☐ Goal kick<br>☐ Corner<br>☐ Penalty<br>☐ Kick off<br>☐ Dropped ball<br>☐ Set Poss<br>☐ Pass back<br>☐ New control | Tasks<br>☐ Passes<br>☐ Headers<br>☐ Tackles<br>☐ Clearances<br>☐<br>☐<br>☐<br>☐<br>☐<br>☐ | |
| ☐ All chances<br>☐ Set Play<br>☐ Set Poss attack<br>☐ Longer attack | ☐ Goal<br>☐ Great chances<br>☐ Average chances<br>☐ Half chances | Ok<br><br>Cancel |

METHOD AND SYSTEM FOR REVIEWING, EDITING AND ANALYZING VIDEO

RELATED APPLICATIONS

This application claims priority from Provisional Application No. 60/116,496 filed Jan. 20, 1999, which is incorporated herein by reference.

FIELD OF THE INVENTION

The present invention relates generally to a method and system for reviewing, editing and analyzing video, and more specifically to a method and apparatus for assisting managers, coaches and athletes in evaluating videotaped performances of sports teams and athletes.

BACKGROUND

Video taping of professional and amateur sports and/or games has been conducted for a number of years. As part of routine preparation for games, team coaches analyze videos depicting past game performances of their opponent teams as well as their own team. This analysis includes analyzing teams as well as individual players to determine a team's and/or player's strengths and weaknesses. There can be many other reasons for team coaches to analyze game videos such as team and/or player improvement. Conventionally, in analyzing a video, a coach must control a conventional video player to play on a conventional monitor such as a television. While analyzing the game, the coach must continuously play, rewind, and/or fast forward the tape to view and analyze desired portions of the game. This process of searching through a video tape can be very time consuming as well as cumbersome for coaches.

Therefore, an unsolved need remains for a method and system for analyzing video data that overcomes deficiencies of the prior art.

SUMMARY OF THE INVENTION

In one aspect of the present invention a system is provided for reviewing, editing and analyzing video data. The system comprises a computer processing system coupled to a plurality of video players. The video players provide video data which can be captured and stored on a data storage medium drive contained in the computer system.

In an embodiment of the present invention, the video players provide video data to the computer system which includes sports events or matches comprising user definable team data, team players, teams in a match and names of players defined in the match. The video data received by the system is captured according to a predetermined video capture level. Captured video data is subsequently stored on the storage medium drive which is contained in the computer system. The captured video data is further processed by defining tasks or labeling the previously captured video data in accordance with one of a plurality of task-episode labels. The captured video data is further processed to define chances, which chances define, for example, portions of the captured video data for which a team and/or players had a chance to score and were or were not successful. Performance of players defined within the captured video data can also be analyzed and the results can be arranged into statistical tables, which reflects player and/or team performance. Topics related to the captured video data can be selected and sorted according to user-defined criteria.

In another aspect of the present invention, a method is provided for reviewing, editing and analyzing video data. The method comprises the steps of defining team data; capturing video data; defining tasks associated with the video data; evaluating chances of scoring; analyzing matches; analyzing players; and selecting predefined topics, wherein statistical data can be generated and arranged to represent team performance and player performance.

BRIEF DESCRIPTION OF THE DRAWINGS

The foregoing and other objects of this invention, the various features thereof, as well as the invention itself, may be more filly understood from the following description, when read together with the accompanying drawings in which:

FIG. 2(*b*) is a control panel for accessing any one of a plurality of dialog boxes;

FIG. 27 is a selection possibilities dialog box;

DETAILED DESCRIPTION

Embodiments of the present invention are described herein with reference to a method and system for evaluating soccer teams, players and matches. As understood by one skilled in the art, the present invention is not limited to soccer applications, but also has applicability in other sports and activities. In addition, in describing embodiments of the present invention herein, the terms soccer and football may be used interchangeably, it being understood that the sport known as soccer in the United States is known as football in many other parts of the world.

Figure 1:
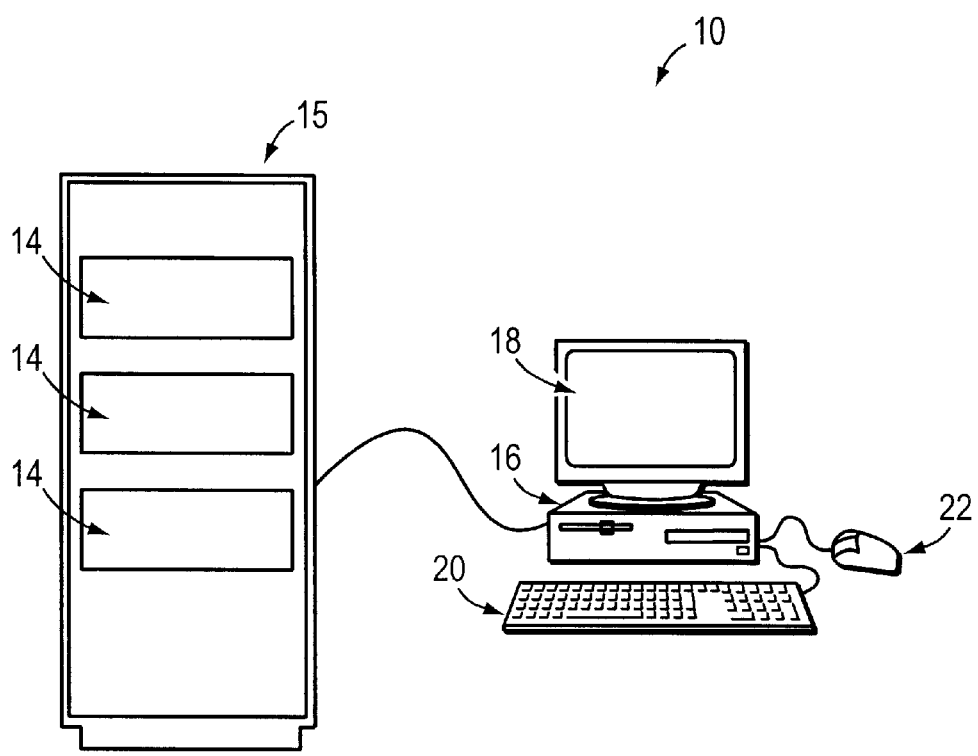
FIG. 1 is a schematic diagram of a system having principles of the present invention.

FIG. 1 shows a system 10 for viewing, editing and analyzing a videotape of a soccer game in accordance with one embodiment of the present invention. The system 10 includes a computer processing system 12, and a plurality of video players 14 contained within a rack 15 and coupled to the computer processing system 12. The computer processing system 12 includes a processor 16, a display 18, a keyboard 20, and a mouse 22. The video players 14 may include one or more video tape players, digital video players or one of a number of other video players known in the art. In some embodiments, the video players may be controlled by software installed in the processor of the computer system 12. In one embodiment, the operating system used in the processor is Microsoft's Windows 98 or an equivalent operating system that provides a graphical user interface. In addition, in embodiments of the present invention, the processing system 12 may include a video capture board as is known in the art, and the cable coupling the processing section to the video players may be a SCART input/output cable.

In embodiments of the present invention a user of the system 10, such as a coach, manager or athlete may use the system to evaluate a prior match of their team or of a competitor. A video tape or some other media on which the prior match has been recorded is loaded into one of the video players, and the video player provides a video signal to the computer processing system 12. The user accesses portions of the recorded video, and may analyze particular aspects of the match as described below. In addition, the user may edit the video and provide edited video to one of the video players 14 for storage therein.

Figure 2A:
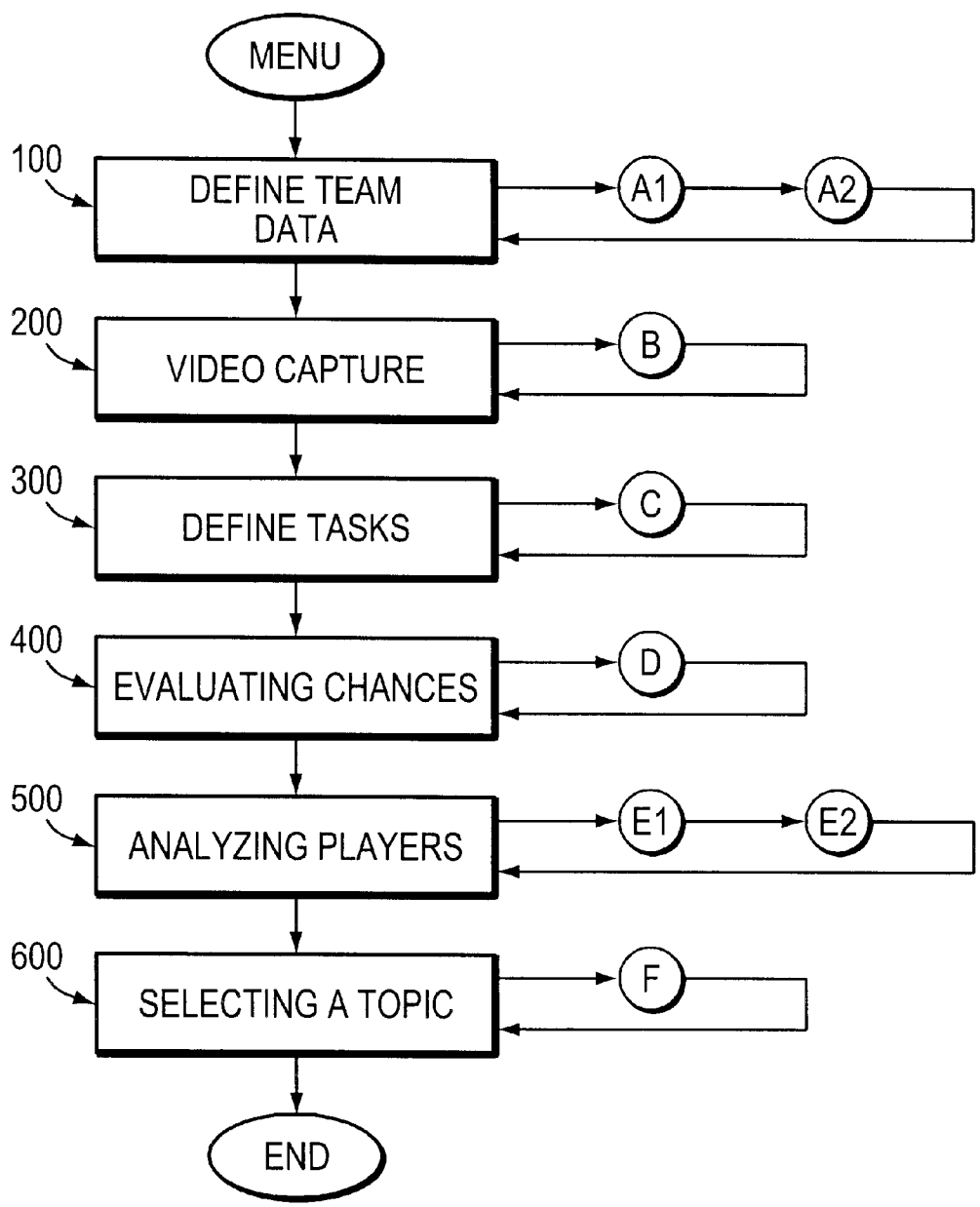
FIG. 2(*a*) is a flow chart showing process steps executable on the system shown in FIG. 1.

Referring to FIG. 2(a), a method for using system 10 (FIG. 1) for reviewing, editing and analyzing video data in accordance with embodiments of the present invention comprises the steps of defining team data at step 100, which data can include team names, team players, teams in a match and names of players defined in the match. Video data received by the system is captured according to a predetermined video capture level at step 200. Captured video data is subsequently stored on a storage medium, such as a hard disk drive, which is contained in the computer system 12 (FIG. 1). The captured video data is further processed by defining tasks at step 300 or labeling the previously captured video data in accordance with one of a plurality of task-episode labels. The captured video data is further processed to define chances at step 400, which chances define, for example, portions of the captured video data for which a team and/or players had a chance to score and were or were not successful. Performance of players defined within the captured video data can also be analyzed and the results can be arranged into statistical data at step 500, which reflects player and/or team performance. Topics related to the captured video data can be selected and sorted according to user-defined criteria at step 600.

Figure 2B:
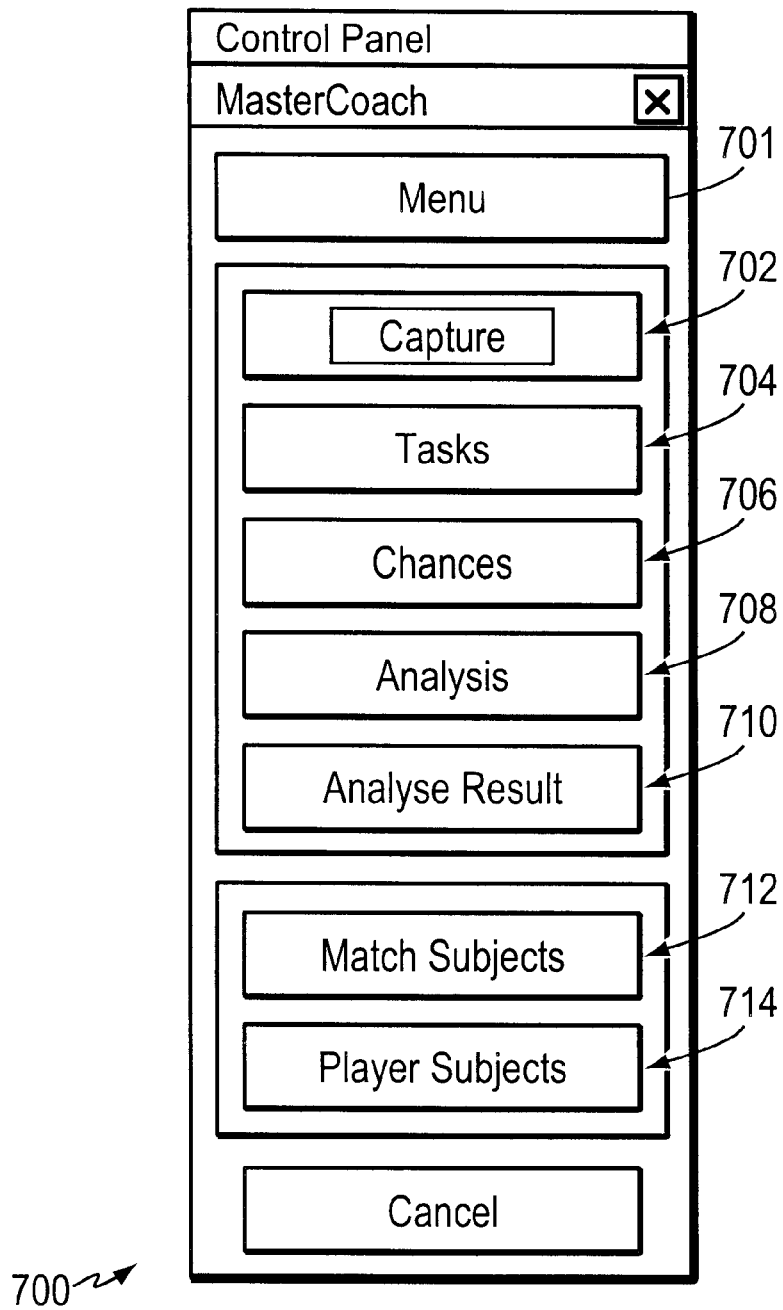

FIG. 2(b) illustrates a control panel 700 that is displayed on system 10 (FIG. 1). The control panel includes a plurality of buttons comprising: Menu 701, Capture 702, Tasks 704, Chances 706, Analysis 708, Analyse result 710, Match subjects 712 and Player subjects 714. The control panel enables the user to select among the aforementioned steps of capturing video data at step 200; defining tasks at step 300; evaluating chances at step 400; and analyze performance as well as results of teams and/or players at step 500. The match subjects 712 and player subjects 714 buttons enable a user to access predefined match and player data.

Figure 3:
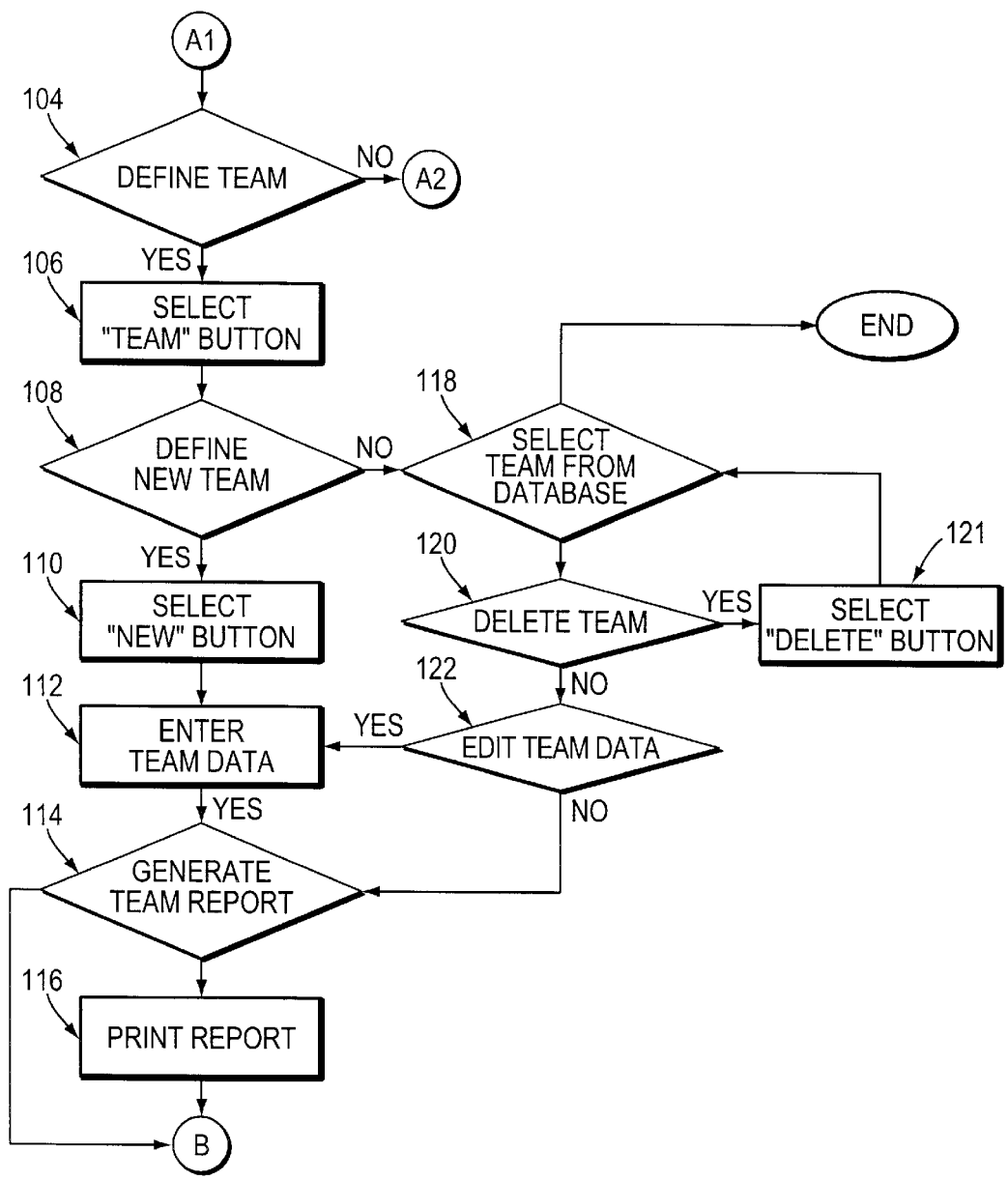
FIG. 3 is a flow chart for defining team data.
Figure 4:
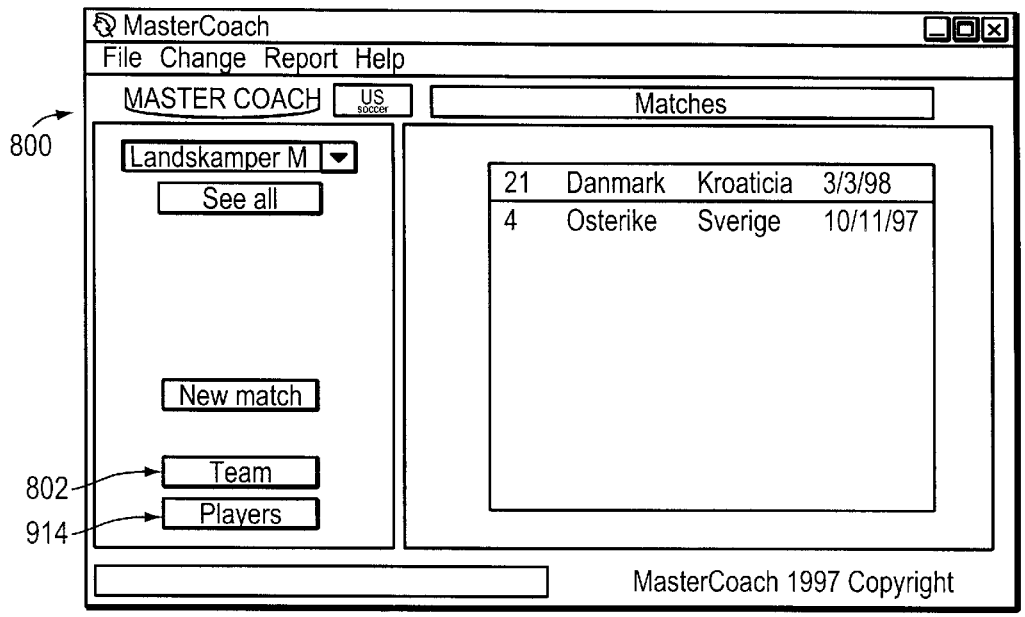
FIG. 4 is a matches dialog box
Figure 5:
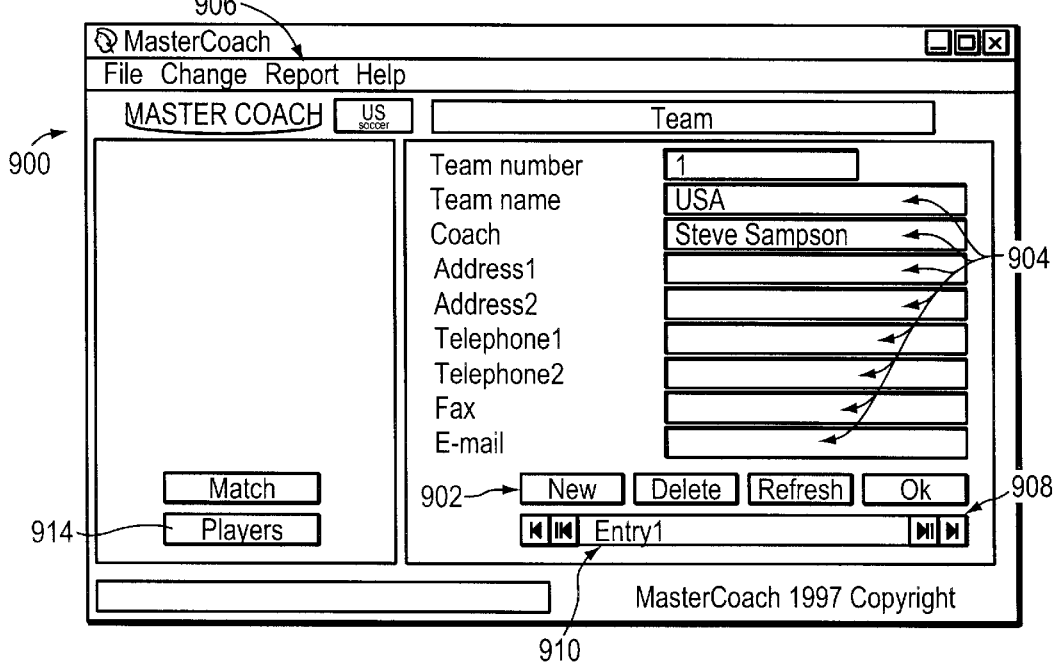
FIG. 5 is a team dialog box.

FIG. 3 is a flow chart for defining team data and includes a process for using the Matches dialog box shown in FIG. 4 and for using the Team dialog box shown in FIG. 5. Referring collectively to FIGS. 3, 4, and 5, the step of defining team data 100 comprises the steps of electing to select a team at step 104 by selecting a "Team" button 802 at step 106 from the matches dialog box 800 to open the "Team" dialog box 900 as shown in FIG. 5. The user can elect at step 108 to define a new team by selecting the "New" button at step 110, which provides the user with a "Team" dialog box similar to that shown in FIG. 5. In FIG. 5, the user can enter general team data at step 112 by typing directly in the data fields 904. Optionally, the user can elect to generate and print a team report at steps 114 and 116 respectively, by selecting the "Report" button 906 from the tool bar defined on the Team dialog box 900. If the user decides to select a team from a previously stored team database list at step 118, the user can select a right arrow 908 or a left arrow 910 from the FIG. 5 Team dialog box 900 to scroll through the team database. As the user scrolls through the team database, team data will be displayed in the team data fields 904 defined in the Team dialog box 900. When a team's data is displayed in the data fields 904, the user can elect to delete the team from the database at step 120 by selecting the "Delete" button 912 defined on the Team dialog box 900. Alternatively, the user can elect to edit team data at step 122 by directly entering data in the data fields 904.

Figure 6:
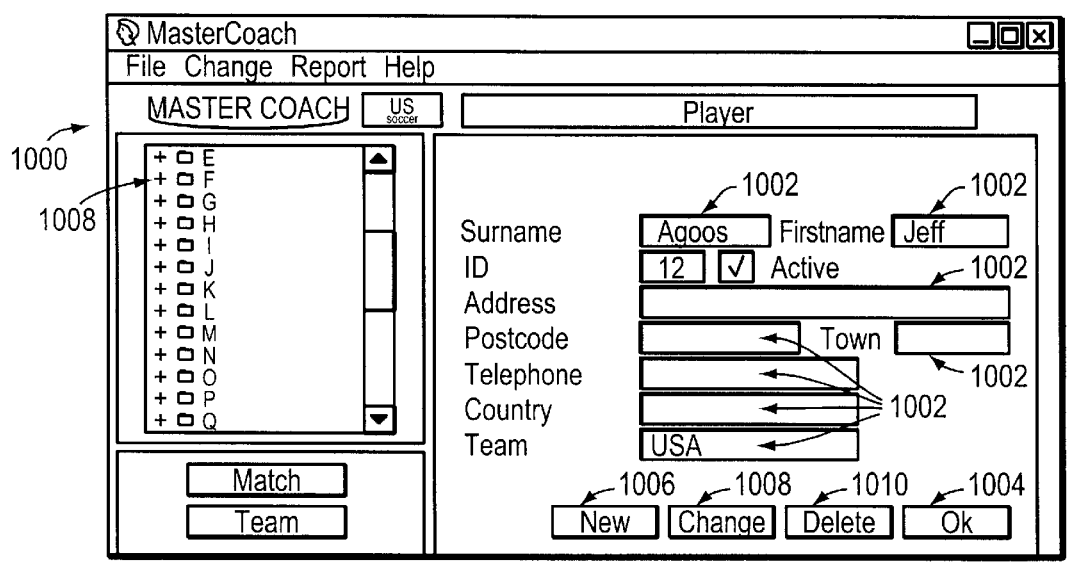
FIG. 6 is a player dialog box.

If the user elects not to define team data at step 104, the user can elect to define player data at step 126 (FIG. 7) by selecting the "Players" button 914, at step 130 (FIG. 7), which button 914 is located on the FIG. 4 or the FIG. 5 dialog boxes 800 and 900 respectively, to display the "Player" dialog box 1000 shown in FIG. 6.

Figure 7:
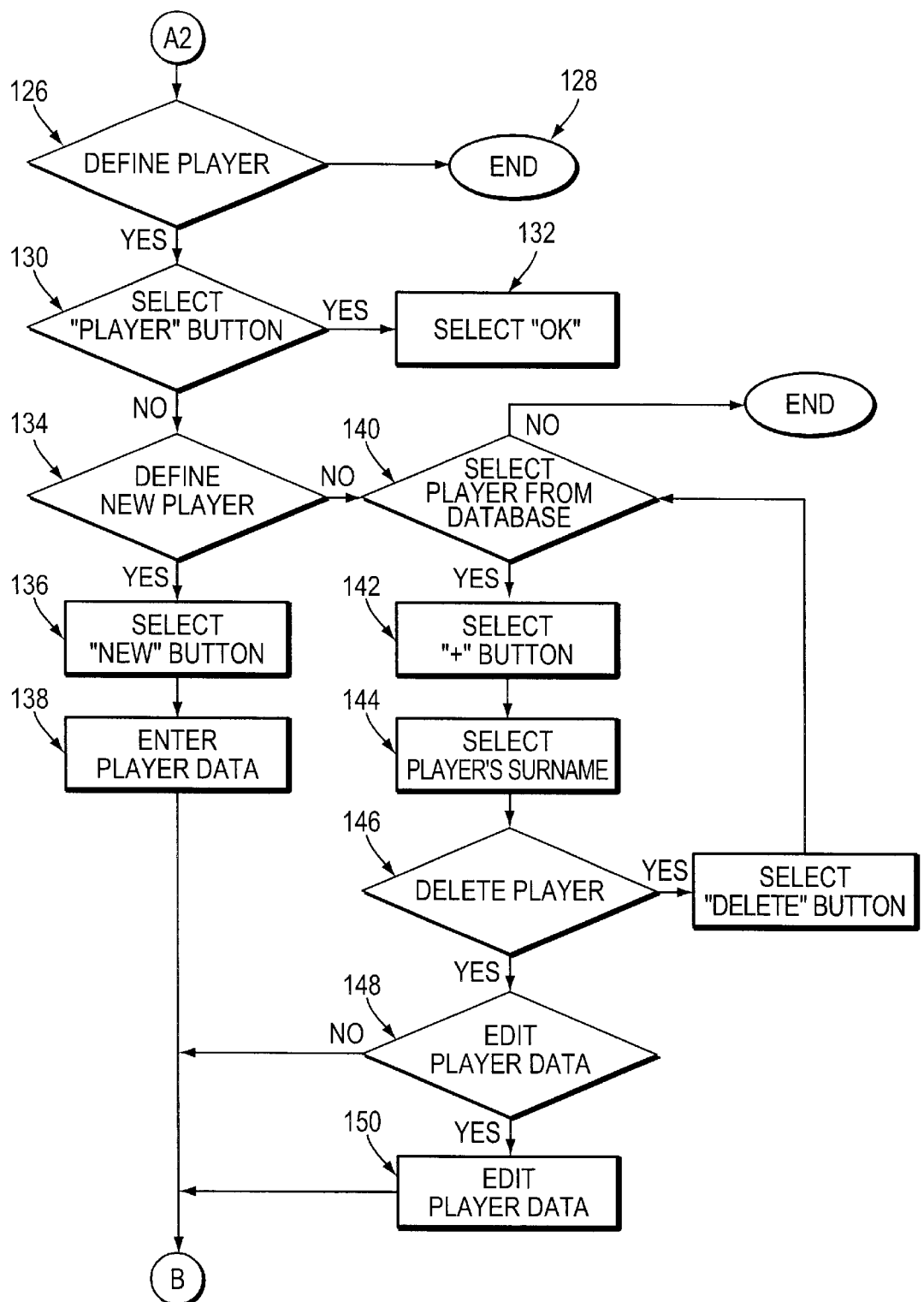
FIG. 7 is a flow chart for defining player data.

Referring collectively to FIGS. 6 and 7, the user can elect to define a player at step 126 or ending at step 128. If the user elects to define a player at step 126, the user can elect to select the player who is shown in the data fields 1002 at step 130 by selecting the "Ok" button 1004 at step 132. If the user elects to define a new player at step 134, the user can select a new player by selecting the "New" button 1006 at step 136. The user can now enter player information at step 138 such as demographic information, into the data fields 1002. On the other hand, if the user elects to select a player from a preexisting player database at step 140, the user can select the player by selecting a "+" button 1008 at step 142, which is associated with a player's surname. Thereafter, the user can select a particular player's surname at step 144. After selecting a player from the player database, the user can elect to delete the player from the database at step 146 or edit the player's demographic information at step 148, which information is contained in the player data fields 1002. If the user elects to edit player data at step 148, the user can immediately enter player data at step 150 into the player fields 1002. If the user elects to delete the player from the database at step 146, the user can select the "Delete" button 1010 at step 152, which Delete button 1010 is shown in FIG. 6. Thereafter, the user can repeat the above steps of selecting other players from the player database, or the user can end the player dialog box 1000 at step 128 by selecting the "Ok" button 1004.

Prior to the commencement of a match or game analysis, a user defines a match in the match database. The user can define a match by selecting the "Match" button 1012 from the FIG. 6. dialog box 1000 to open a "Match data" dialog box 1100 shown in FIG. 8.

Figure 8:
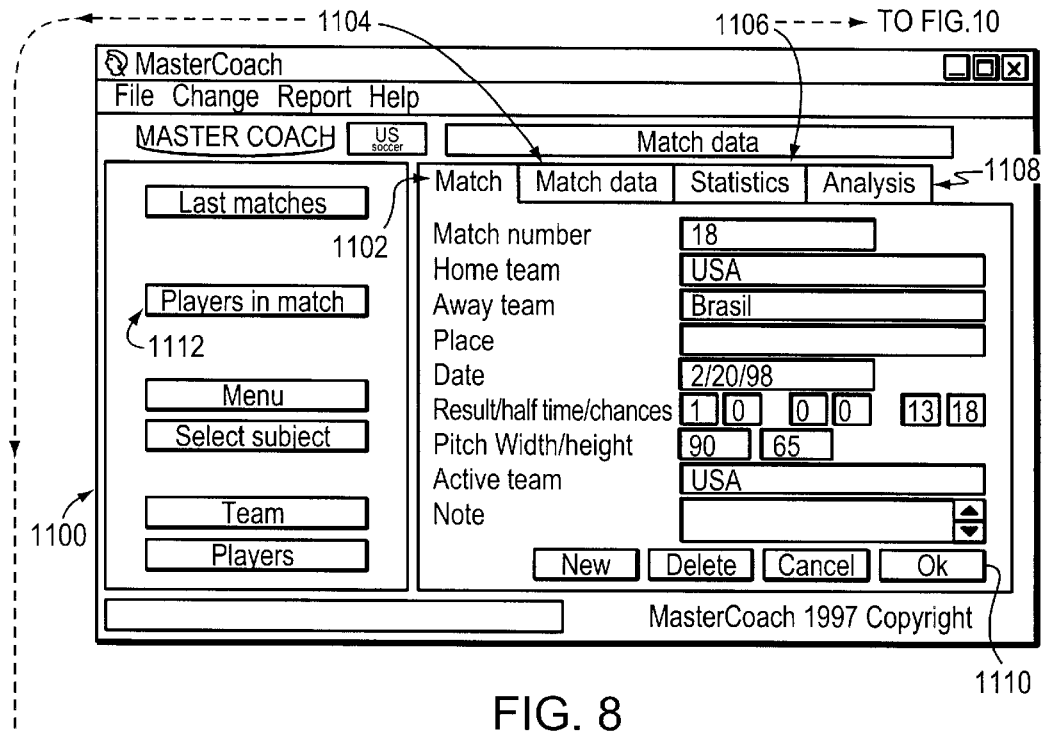
FIG. 8 is a match data dialog box illustrating match tab information.

Referring to FIG. 8, the Match data dialog box 1100 comprises a number of tabs including Match 1102, Match data 1104, Statistics 1106, and Analysis 1108. In FIG. 8, the fields of the Match 1102 can be used to enter/record the location, the date, the score at full time and half time, the pitch size and a short note about the match. Upon completion of entering/recording the above described data, the user can select the "Ok" button 1110 to confirm the data input. After a user has completed viewing a match or game, the user can study the data contained in the Match data and Statistics 1106 tabs.

Figure 9:
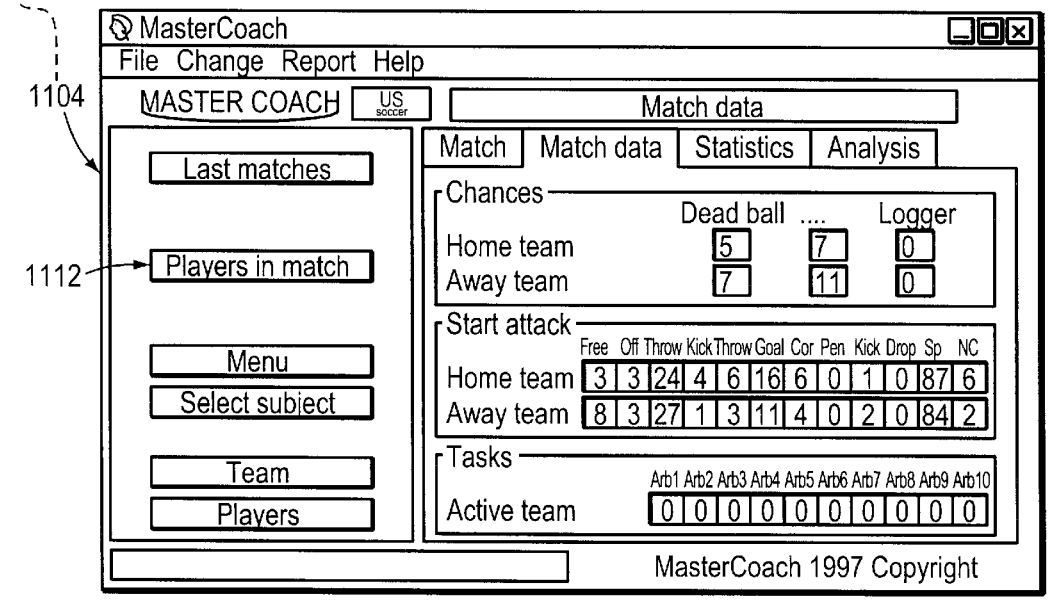
FIG. 9 is a match data dialog box illustrating match data tab information.

FIG. 9 shows data fields contained in the Match data tab 1104. The FIG. 9 data fields summarize all scoring chances, types of attack starts and tasks.

Figure 10:
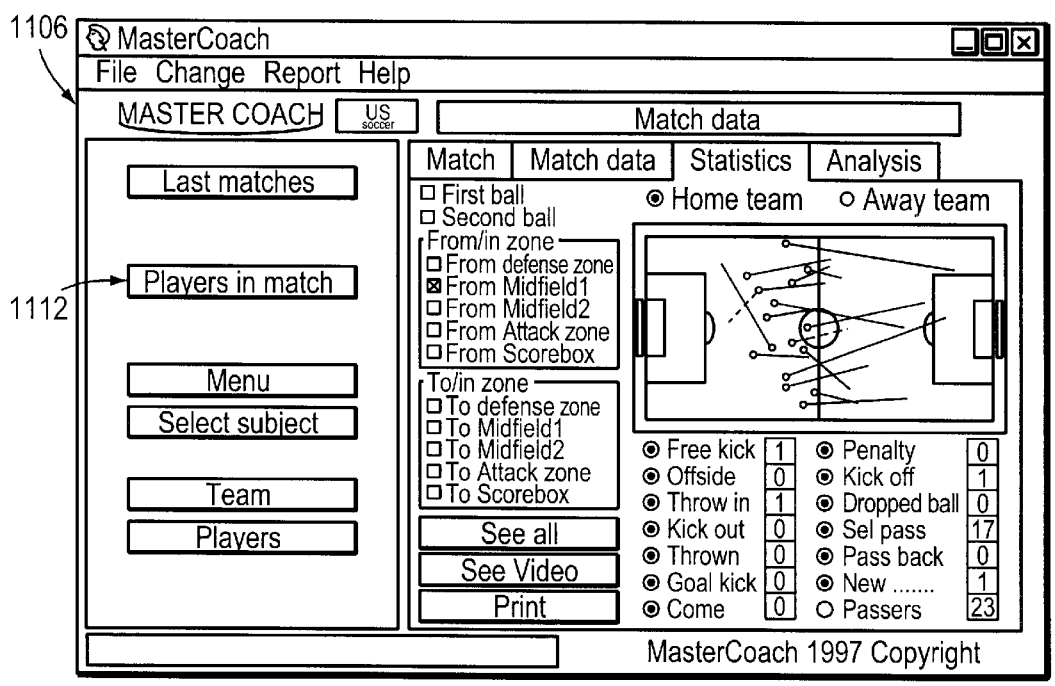
FIG. 10 is a match data dialog box illustrating statistics tab information.

In FIG. 10, depending on the capture level for which video data is captured and stored on a hard disk drive, the Statistics tab 1106 can be opened to show all the passes made on the pitch.

Figure 11:
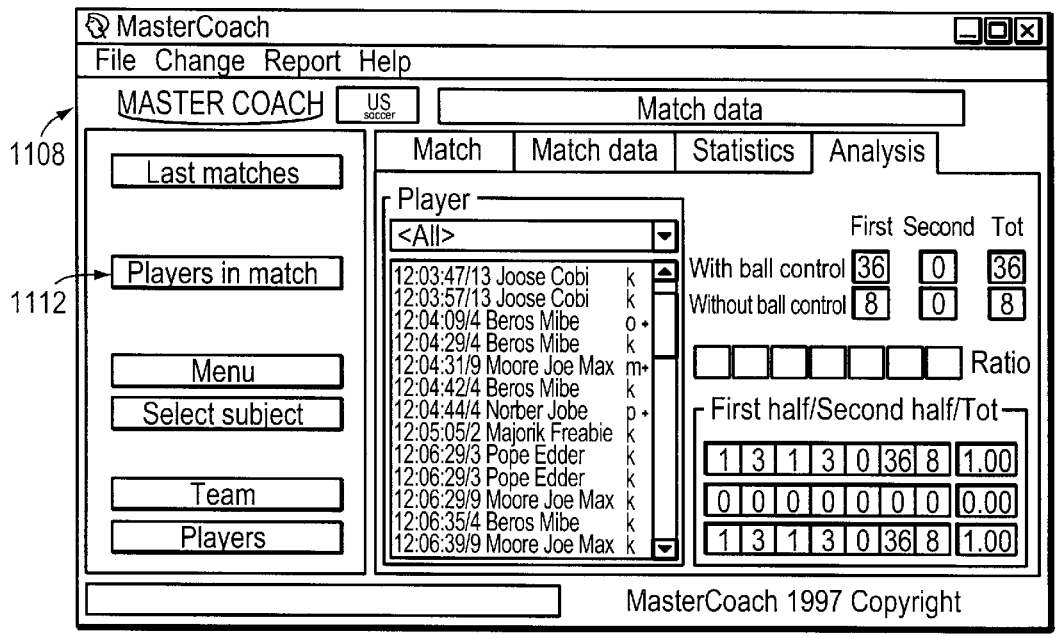
FIG. 11 is a match data dialog box illustrating analysis tab information.

In FIG. 11, if the performance of players defined within the captured video data has been analyzed and recorded, the analyzed and recorded data can be arranged into a statistical format as shown in FIG. 11.

Figure 12:
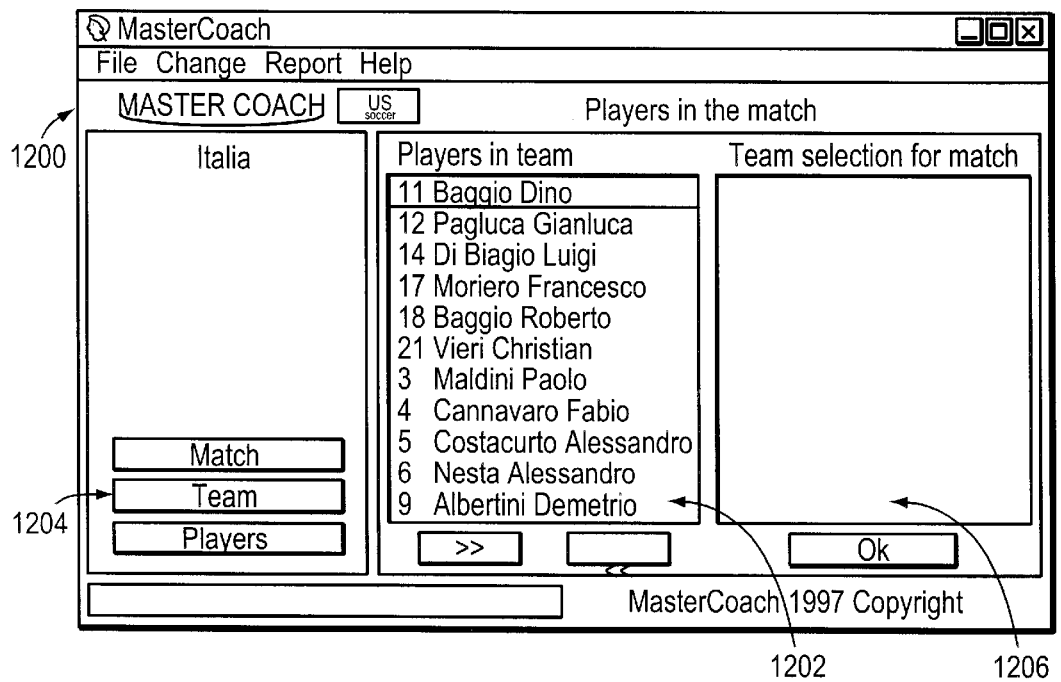
FIG. 12 is a players in the match dialog box.

Players in a match can be defined by selecting the "Players in match" button 1112 from any one of the FIGS. 8–11 dialog boxes to open the "Players in the match" dialog box 1200 shown in FIG. 12. In the Players in the match dialog box 1200, a user can select any one of a plurality of team members from the "Players in team" database and/or list 1202. After selection of each team member, the user can select the "Team" button 1204 to add the selected team member to the "Team selection for match" database and/or list 1206. The process of selecting team members and adding the selected team member to the Team selection for match box can be repeated several times until the Team selection for match box contains a sufficient number of team members for analysis.

Figure 13:
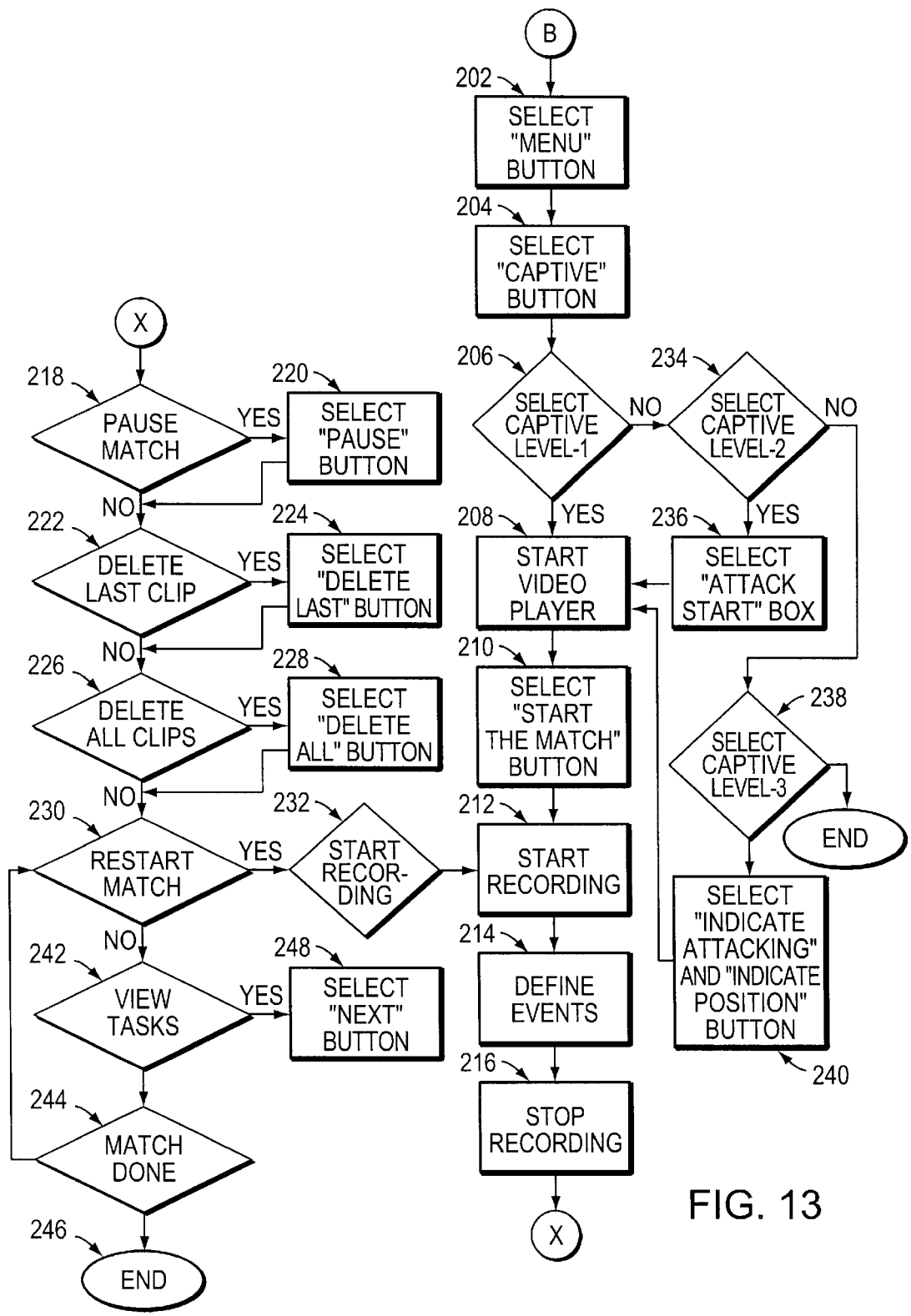
FIG. 13 is a flow chart for video data capture.
Figure 14:
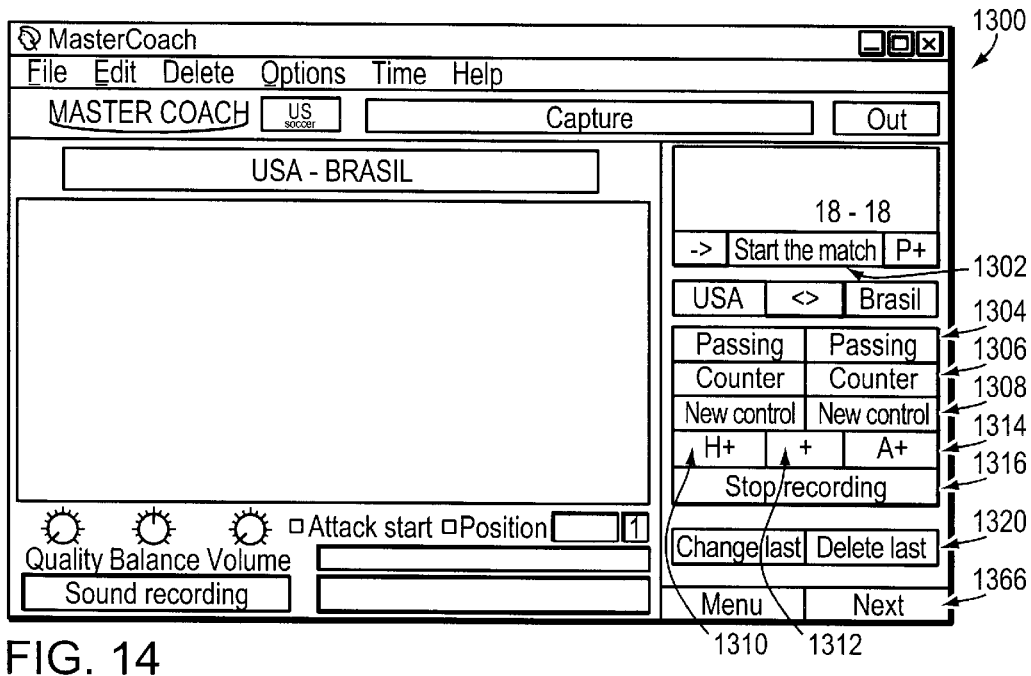
FIG. 14 is a capture level-1 dialog box.

The step of capturing video data as set forth in FIG. 2(a) at step 200 is more specifically described in the flow chart shown in FIG. 13. In the FIG. 13 flow chart, the user can select the "Menu" button 701 (FIG. 2(b)) at step 202 and the "Capture" button 702 (FIG. 2(b)) at step 204. In selecting the Capture button 702, the user is provided with a Capture level-1 dialog box 1300 as shown in FIG. 14. At step 206, if the user elects the capture level-1 dialog box 1300, the user can start the video player 14 (FIG. 1) at step 208, which is coupled with the system 10 (FIG. 1) for providing the video data to be subsequently captured in the form of video clips. The user can then select the "Start the match" button 1302 at step 210. Thereafter, the user can select either the "Passing" button 1304, "Counter" button 1306 or the "New control" button 1308 to start capturing video clips at step 212, which captured clips are stored on the hard disk drive. While video data is in the process of being captured, the user can define capture level-1 events at step 214.

Defining capture level-1 events at step 214 or video clips comprises real-time user defined data event labeling; whereby the user can select any one of the capture level-1 buttons while viewing video data to instantly append an attribute to the viewed data. The capture level-1 buttons including: "Passing" 1304, "Counter" 1306, "New Control" 1308, "A+" 1310, "+" 1312, or "H+" 1314. The Passing button 1304 defines passes, the Counter button 1306 defines counter attacks, the New control button 1308 defines special events, the + button 1312 defines tasks that can be further defined at a later time, the H+ button 1310 defines the home team's scoring chances and the A+ button 1314 defines the away team's scoring chances. The user can stop the capture of a video clip at step 216 by selecting the "Stop recording button" 1316.

The user can elect to pause the match at step 218 by selecting the "Pause" button 1318 at step 220. The Pause button 1318 is in the same position as the Start the match button 1302 and cannot be seen until the Start the match button 1302 is selected. At step 222, the user can elect to delete the last video clip captured by selecting the "Delete Last" button 1320 at step 224 and/or the user can elect to delete all video clips captured at step 226 by selecting the "Delete All" button (not shown) at step 228. At step 230, the user can elect to restart the match to continue playing the video data. When the user views the video data which the user desires to capture, the user can elect at step 232 to start recording another video clip. Thereafter, the above described process of defining video data events 214, stop recording a video clip 216, deleting the previous clip at step 224 or all video clips at step 228 is cyclically repeated until the user has completely viewed all video data provided by the video player 14 and a plurality of video clips have been captured and stored on the hard disk drive.

Figure 15:
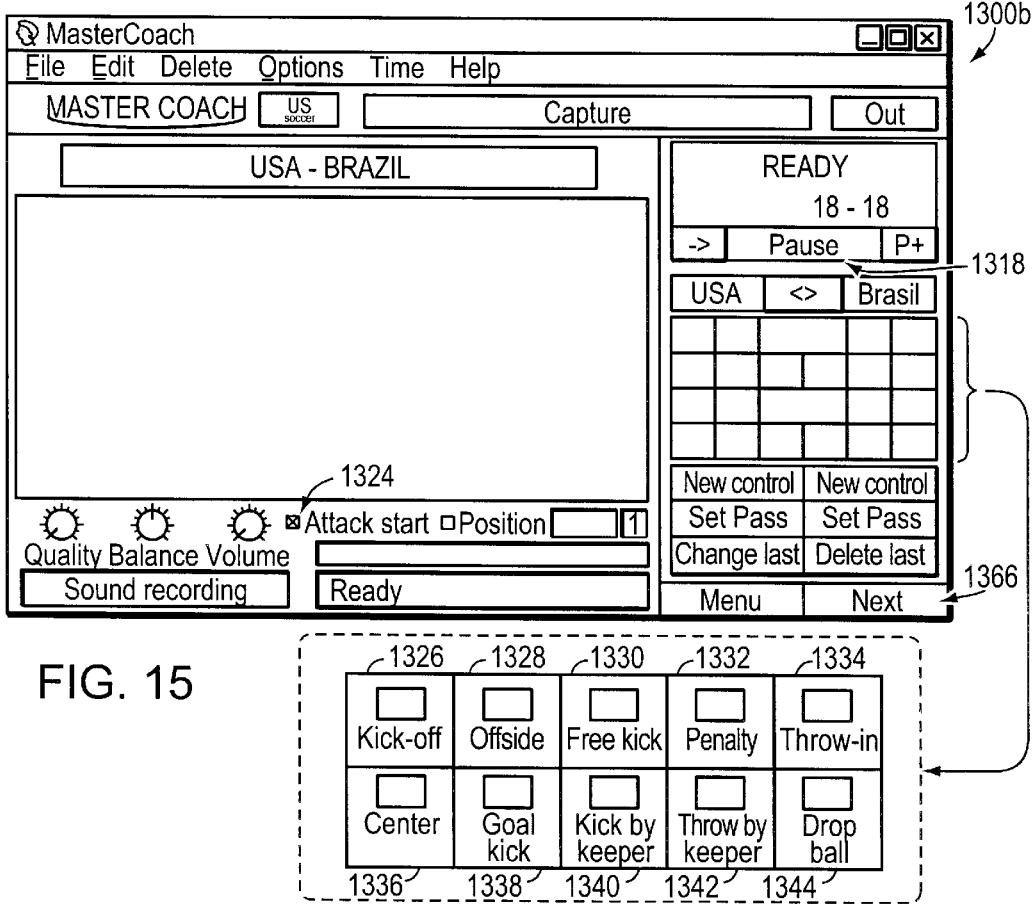
FIG. 15 is a capture level-2 dialog box.

If the user elects to select capture level-2 video data clips at step 234, the user selects the attack start dialog box 1324 at step 236, which provides the user with the capture level-2 dialog box 1300b as shown in FIG. 15. While in capture level-2, the process of capturing and storing video clips on the hard disk drive, is the same as that previously described for video capture level-1, however, the step of defining events at step 214 in video capture level-2 comprises selecting any one of the following capture level-2 buttons: "Kickoff" 1326, "Offside" 1328, "Free kick" 1330, "Penalty" 1332, "Throw-in" 1334, "Comer" 1336, "Goal kick" 1338, "Kick by keeper" 1340, "Throw by keeper" 1342, and "Drop ball" 1344. Statistical data, as shown earlier in the FIG. 10 dialog box, is generated by selecting any one of the capture level-2 buttons in real-time during the process of capturing a video clip.

For example, when the video data comprises a sporting event such as soccer, the user can view the event and capture a plurality of video clips as previously described. While capturing a particular video clip, the user can in real-time define portions of the video segment by selecting any one of the capture level-2 buttons to specify the type of dead ball that an event originated from, for instance a free kick, or a goal kick. Each time one of the level-2 capture buttons is selected, the corresponding statistical count value displayed in FIG. 10 is incremented by one. As a result, the statistical count values of the FIG. 10 Statistics dialog box can be used to generate statistical reports corresponding to user defined events that occur during the video capture process while in video capture level-2.

Figure 16:
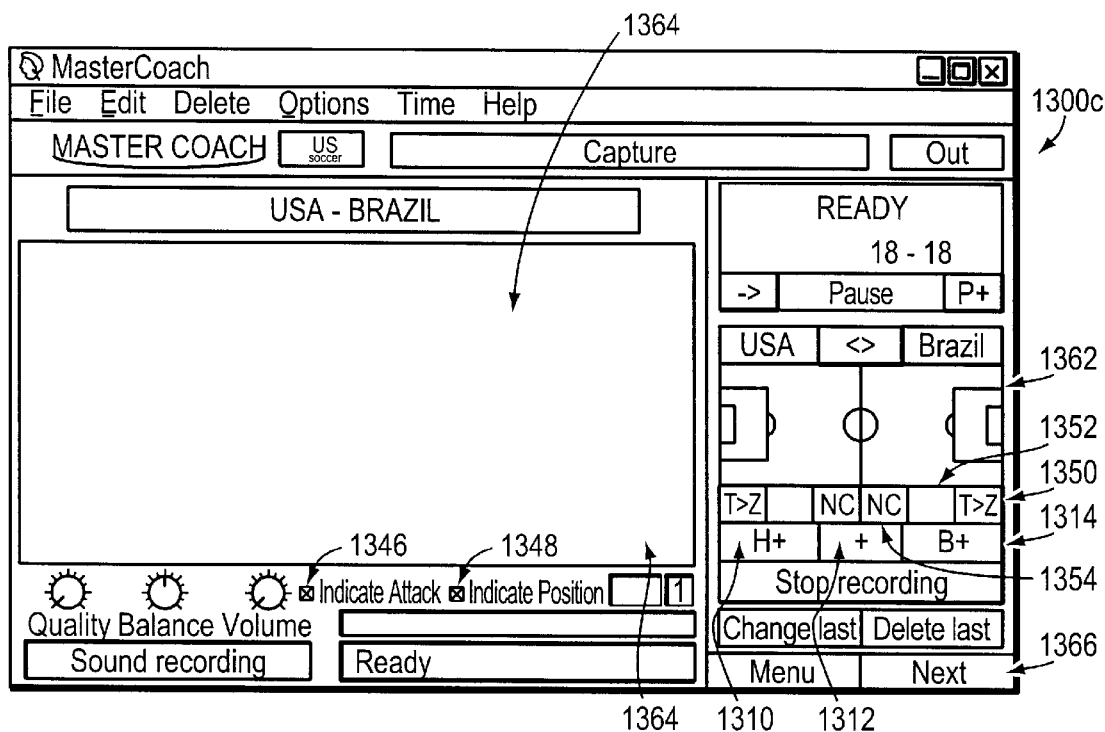
FIG. 16 is a capture level-3 dialog box.

Referring further to FIG. 13, if at step 238, a user elects capture level-3, then the user can select the "Indicate Attacking" 1346 and "Indicate position" 1348 buttons at step 240 to provide the capture level-3 dialog box 1300c as shown in FIG. 16. While in capture level-3, the process of capturing and storing video clips on the hard disk drive is again substantially the same as that previously described for video capture level-1 and video capture level-2. Moreover, defining events at step 214 in video capture level-1 and video capture level-2 are included in video capture level-3. However, video capture level-3 further comprises selecting any one of the following video level-3 capture buttons. "To GK" 1350, "BD" 1352, "N.C." 1354, "+" 1312, "H+" 1310 and "A+" 1314, where GK 1350 defines a playback to the keeper, BD 1352 defines a successful tackle by an opponent, N.C. 1354 subdivides a long attack, +1312 defines tasks, H+ 1310 defines the home team's scoring chances, and A+ 1314 defines the away team's scoring chances. Additionally, the video capture level-3 includes a field of play area 1362 which enables a user to record positions and passes that occur during the capture of a video clip.

For example, when a user is capturing a video clip in video capture level-3, the user can view the video data in the video display window 1364. If the user desires, the positions of players and the movement of, for example, a soccer ball can be traced on the field of play 1362. As a result, video capture level-3 can provide a plurality of video clips that include play position and ball position on the field of play.

Figure 17:
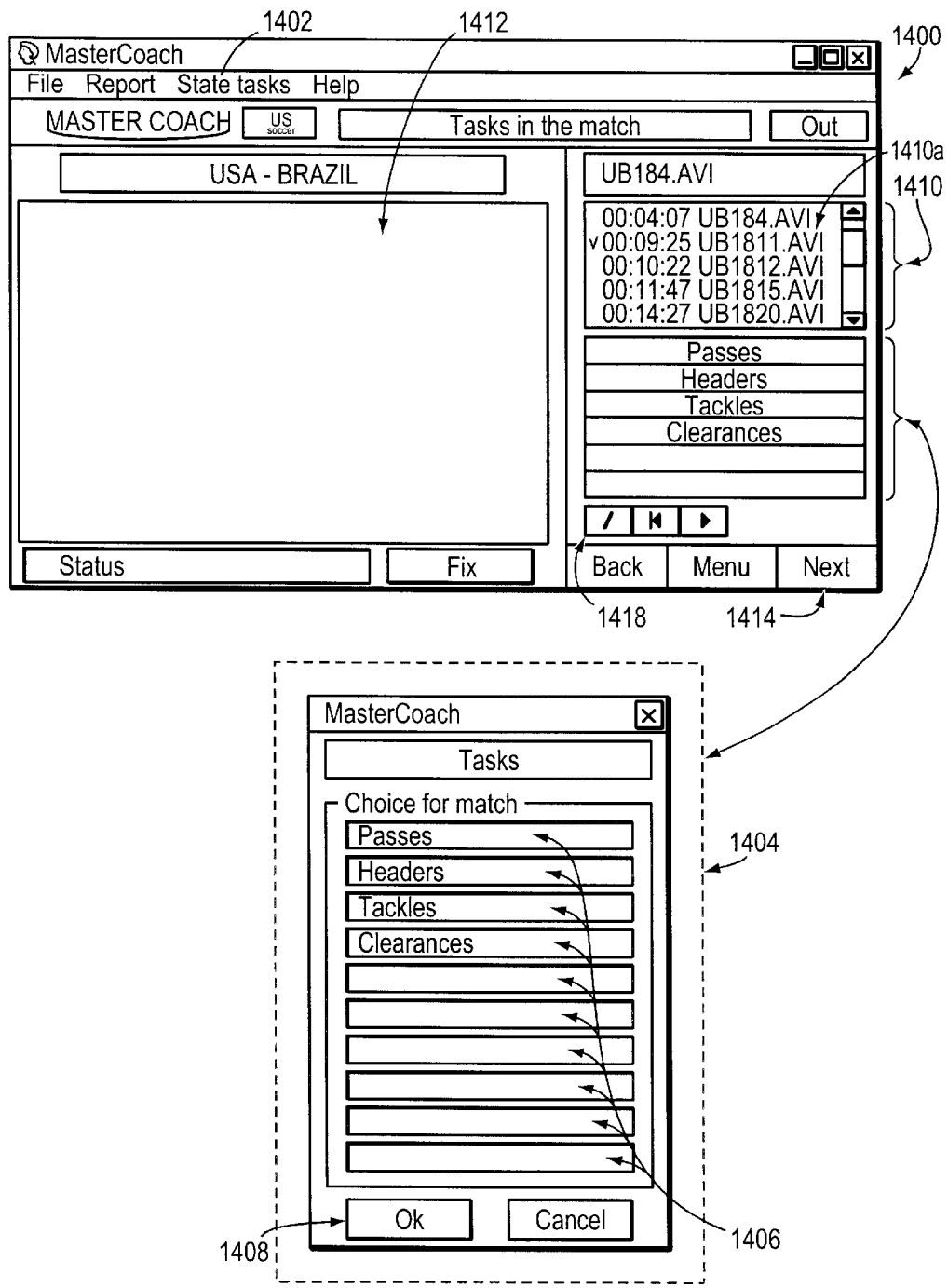
FIG. 17 is a tasks in the match dialog box.

Referring again to FIG. 13, if a user elects not to restart a match at step 230, the user can elect to view tasks in the match at step 242 by selecting the "Next" button 1366, at step 248. The Next button 1366 can be selected from any one of FIGS. 14–16 to provide the user with the "Tasks in the match" dialog box 1400 as shown in FIG. 17. At step 244 of FIG. 13, the user can elect to restart the match or the user can elect to end the process at step 246.

Figure 18:
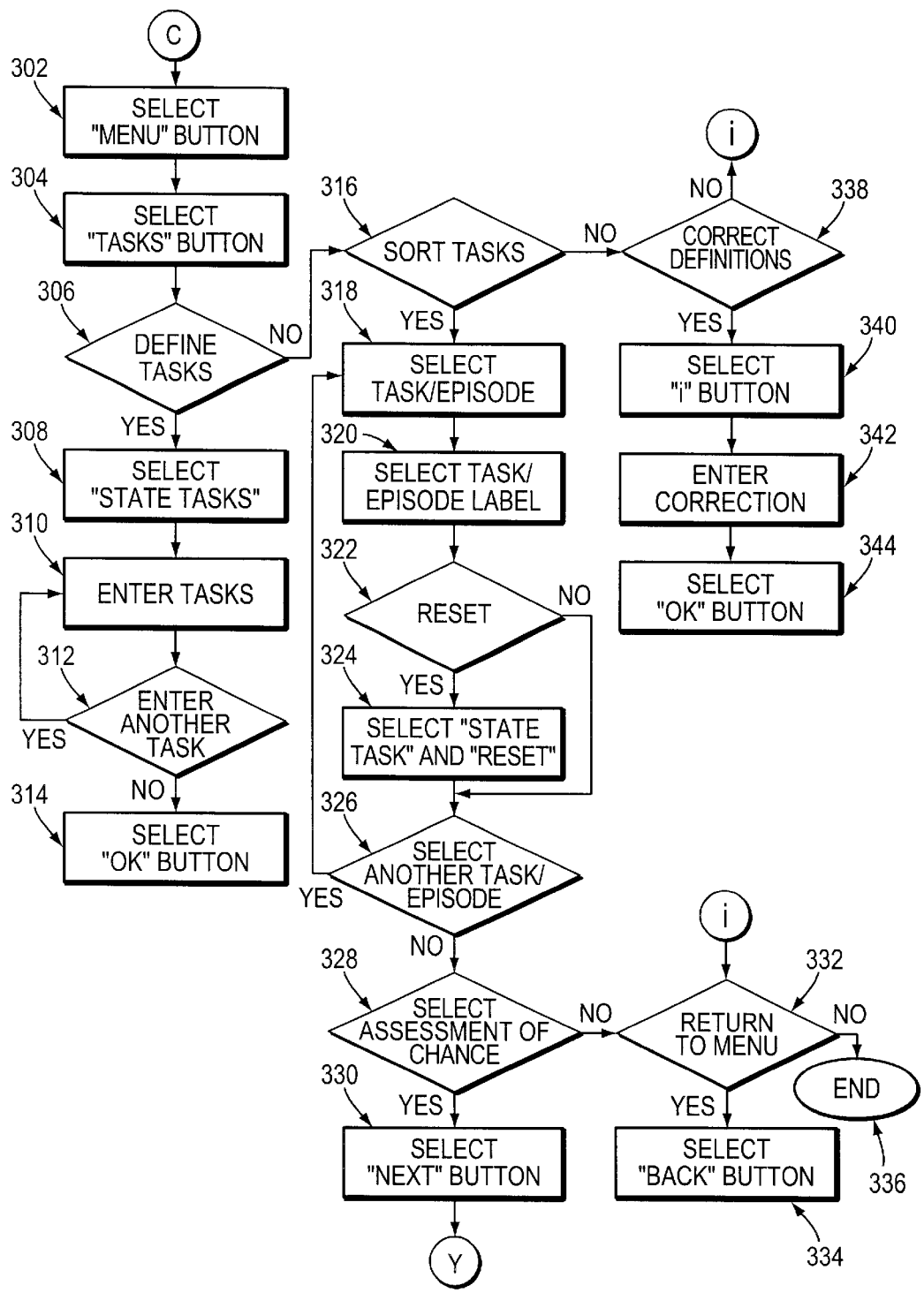
FIG. 18 is a flow chart for defining tasks.

Alternatively and as shown in FIG. 18, the user can select the "Menu" button (FIG. 2(*b*)) at step 302 and the user can also select the "Tasks" button (FIG. (2*b*)) at step 304 to provide the user with the "tasks in the match" dialog box as shown in FIG. 17.

Referring to FIGS. 17 and 18 collectively, a user can further elect to define tasks at step 306 which requires the user to select the "State tasks" 1402 at step 308 from the menu bar shown in FIG. 17 and select "Tasks"(not shown) from a drop down menu generated by the State tasks button 1402. As a result, the "Tasks" dialog box 1404 will be provided to the user so that the user can enter tasks data at step 310. The task data is entered into the data fields 1406 defined on the Tasks dialog box 1404. In step 312, the user can elect to repeat the process in step 310, which at the user's discretion can be repeated to enter a plurality of task data into the data fields 1406 of the task dialog box 1404. Upon completion, the user can select the "Ok" button 1408 at step 314.

If the user elects to sort tasks at step 316, the user can select a task/episode at step 318 by highlighting one or more tasks/episodes 1410*a* contained in the task/episode list 1410. The task/episode list 1410 is generated as a result of the user selecting the "+" button 1312 (FIGS. 14–16) during the video capture process. After each task is selected at step 318, a task/episode label is selected, at step 320, from the task list 1404 that best corresponds with the captured task/episode. For example, the user can select a captured task/episode at step 318 and view it on the play area 1412. Thereafter, the user can select a label such as Passes or Header, to correspond with the selected task/episode which was viewed on the play area 1412.

If a user mistakenly assigns an incorrect label to a task/episode, the user can elect to reset the assignment at step 322 by selecting State tasks button 1402 and Reset button (not shown) at step 324 from a drop down list provided by the State task button 1402. If no mistakes are made, the user can elect, at step 326, to cyclically select and label a plurality of tasks/episodes 1410*a* from the tasks/ episodes list 1410 until all previously captured tasks are labeled or the user no longer desires to continue.

Figure 21:
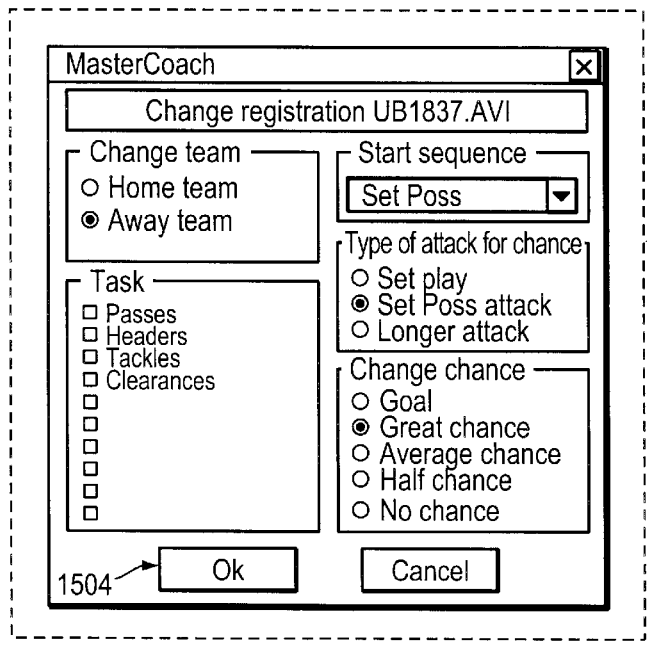
FIG. 21 is a change registration dialog box.

At step 338, the user can elect to correct definitions of attributes assigned to a captured video clip by selecting the "i" button 1418 at step 340, which opens a "Change registration" dialog box 1502 as shown in FIG. 21. The user can thereafter enter any corrections into the Change registration box 1502 at step 342 and select an "ok" button 1504 at step 344 when complete.

At step 328, the user can elect to open the "Assessment of chance" dialog box (FIG. 20), by selecting the "Next" button 1414 at step 330 from the FIG. 17 dialog box. If the user decides not to open the assessment of chance dialog box at step 328, the user can elect to return to the Menu (FIG. 2(*a*)) at step 332 by selecting the "Back" button 1416 at step 334 from the FIG. 17 dialog box. If the user does not elect to return to the menu at step 332, the user can end processing at step 336.

Figure 19:
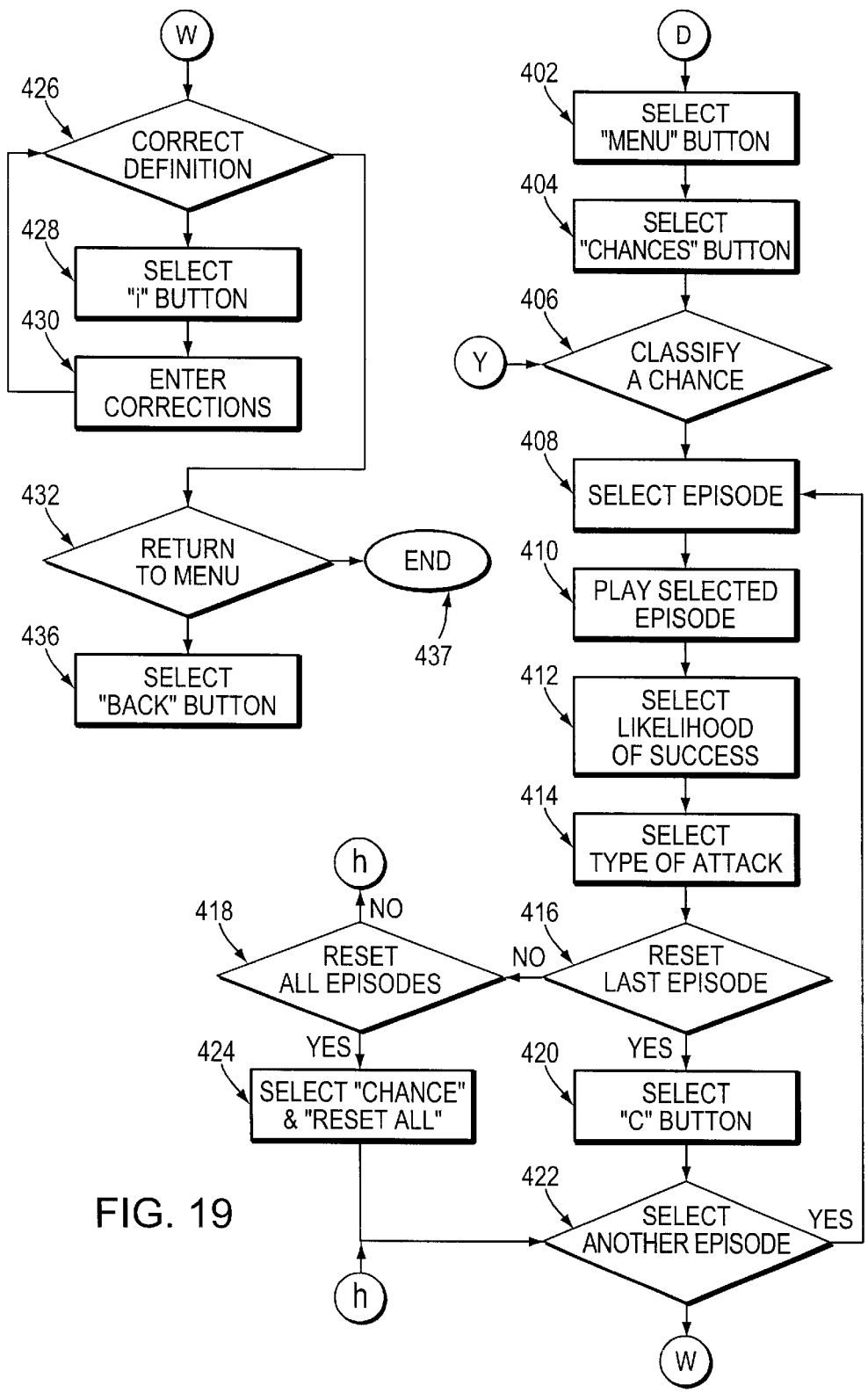
FIG. 19 is a flow chart for defining chances.
Figure 20:
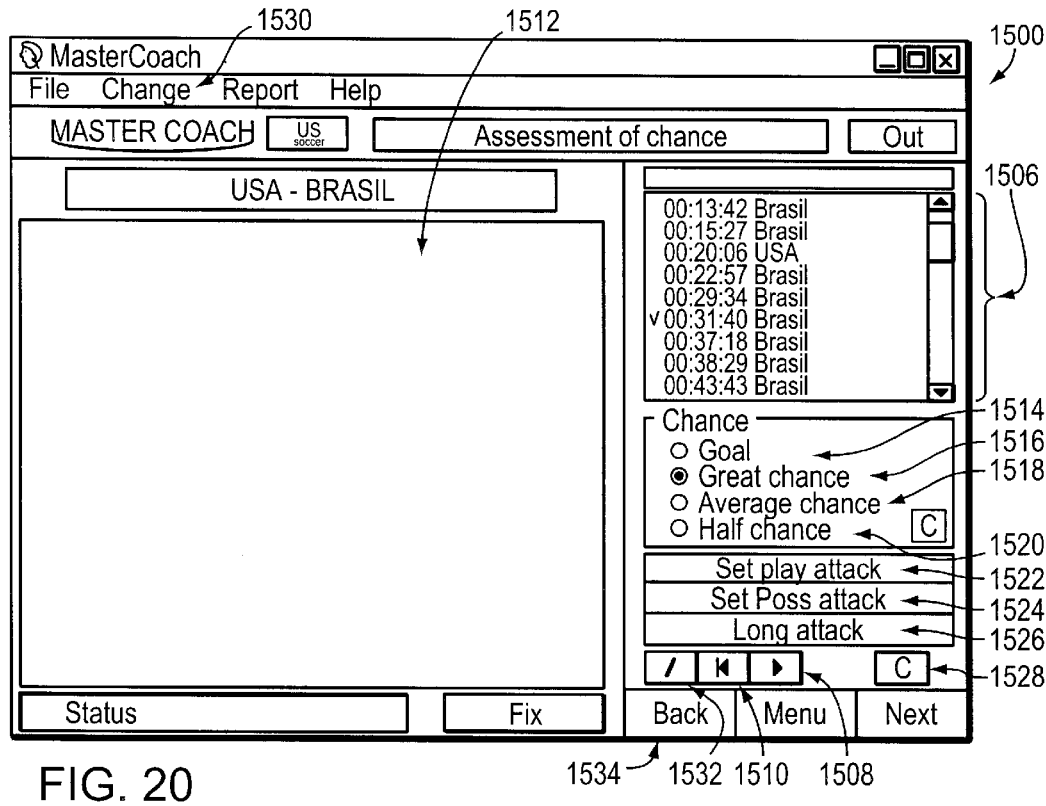
FIG. 20 is an assessment of chances dialog box.

Alternatively and as shown in FIG. 19, the user can select the "Menu" button 701 (FIG. (2*b*)) at step 402 and the user can also select the "Chances" button 706 (FIG. 2(*b*)) at step 404 to provide the user with the "Assessment of chance" dialog box 1500 as shown in FIG. 20.

Referring to FIGS. 19 and 20 collectively, the user can elect to classify a chance at step 406 by selecting an episode from the episode list 1506 at step 406 shown in FIG. 20. The episode list is generated as a result of the user selecting the H+ 1310 and/or A+ 1314 buttons (FIGS. 14–16), during the capture of video clips which respectively corresponds to the home team's chance and the away team's chance of scoring a goal. Thus, after the user selects an episode at step 408, the user can play the episode at step 410 by selecting a forward arrow 1508 or a reverse arrow 1510. The forward 1508 and the reverse 1510 arrows are defined in the Assessment of change dialog box 1500. Thereafter, the selected episode containing a captured video clip of either a home team player scoring a goal or an away team member scoring a goal can be viewed in the play area 1512. At step 412, the user can select the likelihood of success for which the previously viewed goal was achieved by selecting any one of the buttons: "Goal" 1514, "Great chance" 1516, "Average change" 1518, or "Half chance" 1520. The user can select the type of attack, based on the user's interpretation of the viewed video clip at step 414, by selecting any one of the buttons: "Set play attack" 1522, "Set Poss Attack" 1524 or "Long attack" 1526. The user can elect to reset the last episode classified at step 416 or the user can elect to reset all episodes classified at step 418. If the user elects to reset the last episode at step 416, the user can select the "C" button 1528 at step 420. At step 422, the user can elect to select another episode and cyclically repeat the above steps for classifying all of the episodes defined in the episode list 1506. If the user elects to reset all episode classifications at step 424, the user can select "Change" 1530 from the menu bar and "Reset all"(not shown) from a drop down list provided therefrom.

If the user elects not to repeat the above process for classifying scoring chances of the remaining episodes at step 422, the user can elect to correct definitions previously assigned to captured video clips at step 426, which clips may have been erroneously assigned attributes during the task sorting process and chance classifying process.

If the user elects to correct definitions at step 426, the user can select the "i" button 1532 at step 428 to open the "Change registration" dialog box 1502 as shown in FIG. 21. At step 430, the user can enter any correction directly by selecting one or more boxes shown in FIG. 21. If the user elects not to correct definitions at step 426, the user can either elect to return to the Menu at step 432 by selecting the "Back" button 1534 at step 436 or the user can end analysis at step 437. step 430, the user can enter any correction directly by selecting one or more boxes shown in FIG. 21.

If the user elects not to correct definitions at step 426, the user can either elect to return to the Menu at step 432 by selecting the "Back" button 1534 at step 434 or the user can end analysis at step 436.

Figures 22, 25:
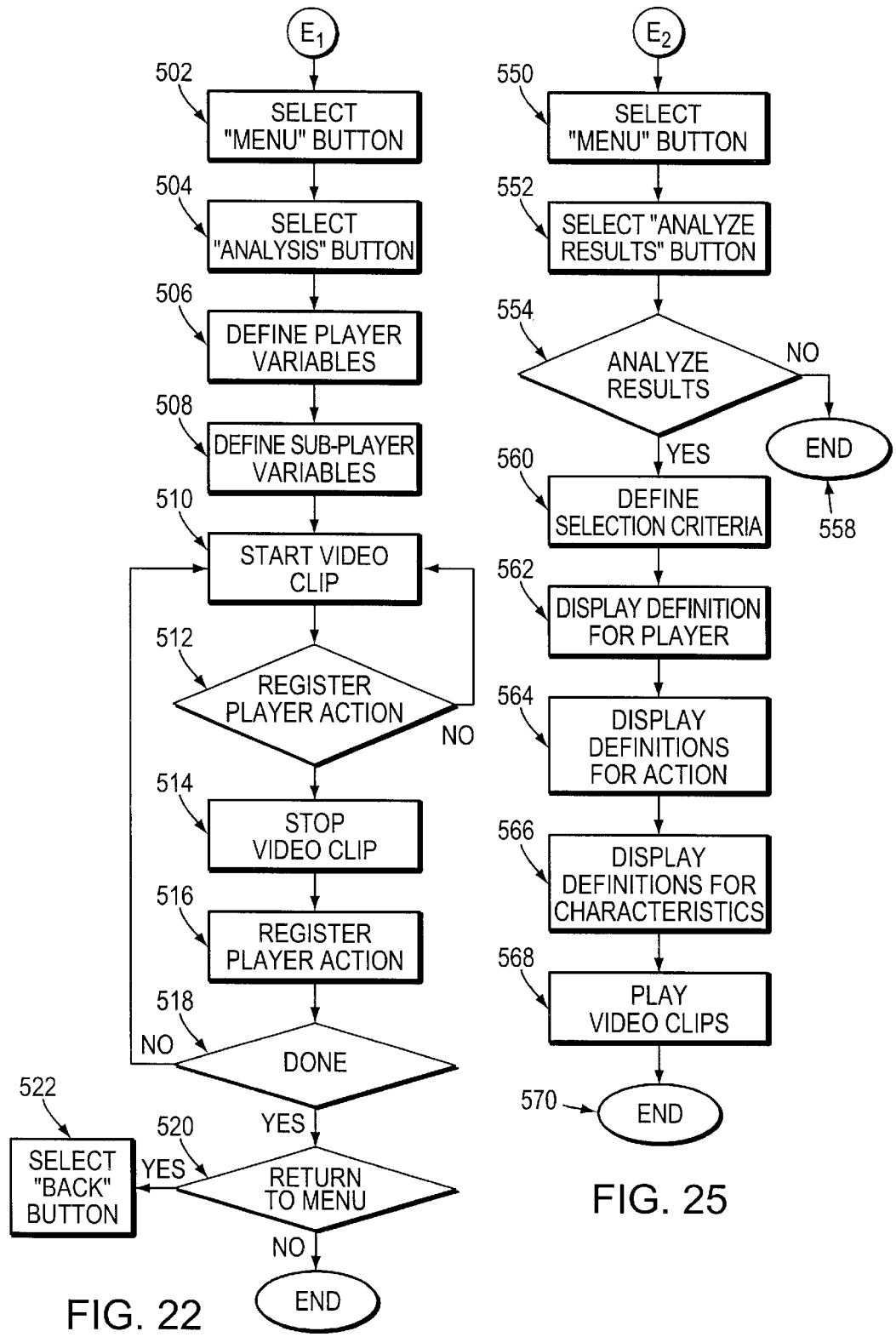
FIG. 22 is a flow chart for analyzing players in a match.
FIG. 25 is a flow chart for analyzing results from a match.
Figure 23:
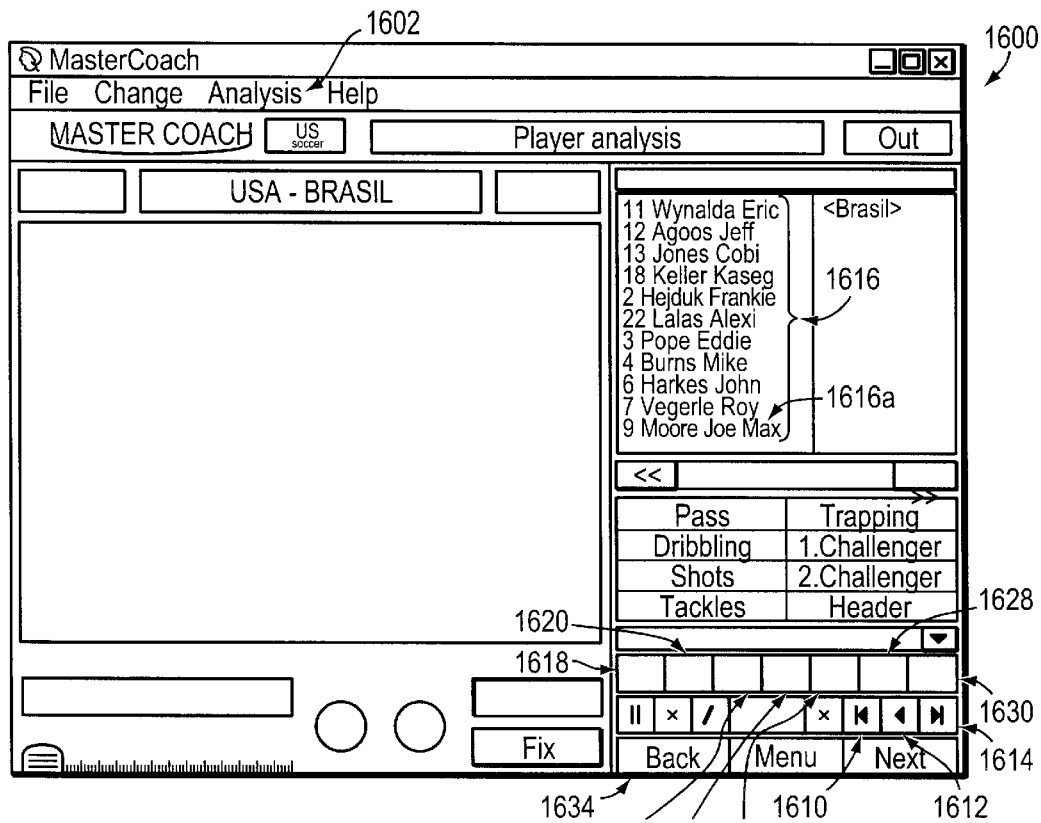
FIG. 23 is a player analysis dialog box.
Figure 24:
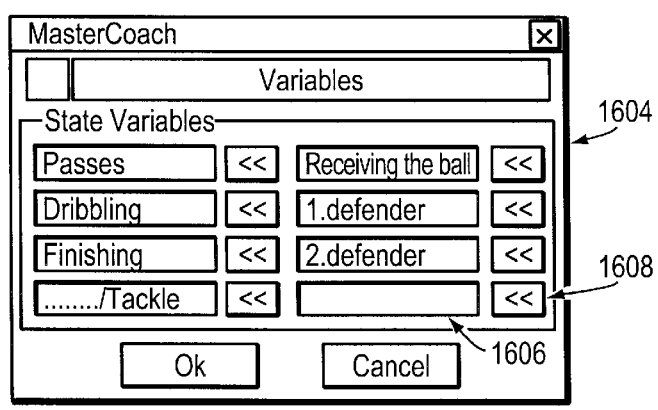
FIG. 24 is a variables dialog box.

Referring to FIGS. 22, 23 and 24, the user can conduct a player analysis by selecting the "Menu" button 701 (FIG. 2(*b*)) at step 502 and by selecting the "Analysis" button 708 (FIG. 2(*b*)) at step 504 to provide the user with the "Player analysis" dialog box 1600 as shown in FIG. 23.

Prior to using the Player analysis dialog box 1600, the user defines player variables at step 506, by selecting the "Analysis" button 1602 from the menu bar and "Variable for player analysis"(not shown) from a drop down list provided by the Analysis button 1602 to provide the user with the "Variables" dialog box 1604 as shown in FIG. 24. At this point, the user can enter variables directly into the FIG. 24 data fields 1606, or the user can use default variables. Further, the user can define sub-variables at step 508 by selecting an arrow button 1608 which is associated with a variable contained in a data field of the FIG. 24 dialog box 1604. For example, the user can select the arrow adjacent to the "Passes" data field to subdivide Passes into Long passes and Short passes.

At step 510, the user can start a video clip by selecting: a left arrow with a bar 1610 to start the first video clip; a left arrow 1612 to start the previous video clip; or the right arrow with a bar 1614 to start the next video clip. At step 512, the user continues watching video clips until electing to register a player action, at which point the user stops the video clip at step 514. The user can then register the player action at step 516 by selecting a player 1616*a* from the list of players 1616 for which an action will be assigned. The user then selects any one of the following buttons to assign an action to the selected player: "D+" 1618, "O+" 1620, "M–" 1622, "P–" 1624, "D–" 1626, "IC" 1628, or "IW" 1630, where the D+ button 1618 is a "Defensive plus for moves involving the first defender, including tackling and taking possession. The O+ button 1620 is an "Offensive plus" for moves involving the first attacker, including breakthrough passes, breakthroughs using ball control/dribbling or other skills, as well as finishing and attacking skills leading to scoring opportunities and goals. The M– button 1622 is a "Passes minus" for moves involving the first attacker, including long crosses and passes to the opposition, inaccurate breakthrough passes and inaccurate passes in general. The D– button 1626 is a "Defensive minus" for moves involving the first, second and third defender, including inadequate skills and position errors for the respective defender. The IC button 1628 is used to define "neutral actions" where the player has possession, and the IW button 1630 is used to define "Neutral actions", where the player does not have possession of the ball.

At step 518, if the user is done at step 518, the user can elect to return to the Menu 701 (FIG. 2(*a*)) at step 520 by selecting the Back button 1634 at step 522. If the user is not done at step 518, the user can elect to cyclically repeat the above steps 510 through 516 for registering player actions for all of the players contained in the player list. If the user does not elect to return to the menu at step 520, the user can end processing at step 524.

Figure 26:
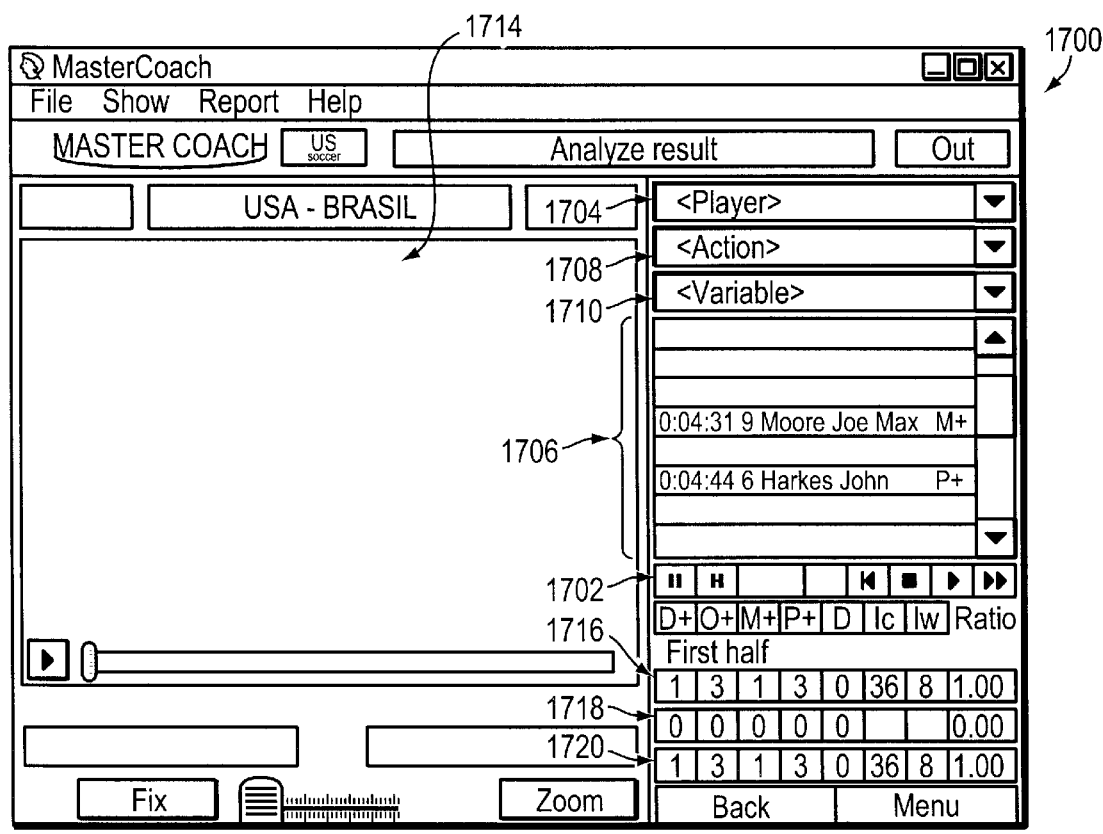
FIG. 26 is a analyze results dialog box.

Referring to FIGS. 25 and 26, the user can analyze player results by selecting the "Menu" button 701 (FIG. 2(*a*)) at step 550 and by selecting the "Analyze results" button 710 (FIG. 2(*a*)) at step 552 to provide the user with the "Analyze results" dialog box 1700 as shown in FIG. 26.

Referring collectively to FIGS. 25, 26 and 27, at step 554, the user can elect to analyze player results or end the player analysis at step 558. If the user elects to analyze player results, the user can define selection criteria at step 560, by selecting a double bar box 1702 from the FIG. 26 dialog box for opening the "Selection possibilities" dialog box 1704 as shown in FIG. 27. In the FIG. 27 dialog box, the user can select a plurality of boxes, which boxes are associated with previously defined player actions which can be viewed in the Analyze results dialog box 1700 as shown in FIG. 26.

At step 562, the user can display all previously defined definitions for a particular player by selecting a Player list button 1704 which provides a list of players and associated player definitions in the data table 1706 shown in FIG. 26. At step 564, the user can display all definitions for a particular action, by selecting the Action list button 1708 which provides a list of actions in the data table 1706 that are associated with a player. At step 566, the user can display all definitions for a particular variable or player characteristic, by selecting the Variable list button 1710 which provides a list of variables or player characteristics in the data table 1706 that are associated with the player. At step 568, after selecting either the Player button 1704, Action button 1708, or the Variable button, the user can select any one of the displayed player, action or player characteristic definitions displayed in the data table, and a previously captured video clip associated therewith can be viewed in the video playback window 1714 of the FIG. 26 dialog box. At step 570, the analysis of results ends.

Additionally, the user can display statistics for player characteristics by selecting one or more of the following buttons: D+, O+, M–, P–, D–, IC and/or IW, (all buttons of which have been previously defined FIG. 23) which buttons provides the user with a summation of previously defined player statistical characteristics as shown in the First half 1716, Second half 1718, and 1720 boxes.

Figure 28:
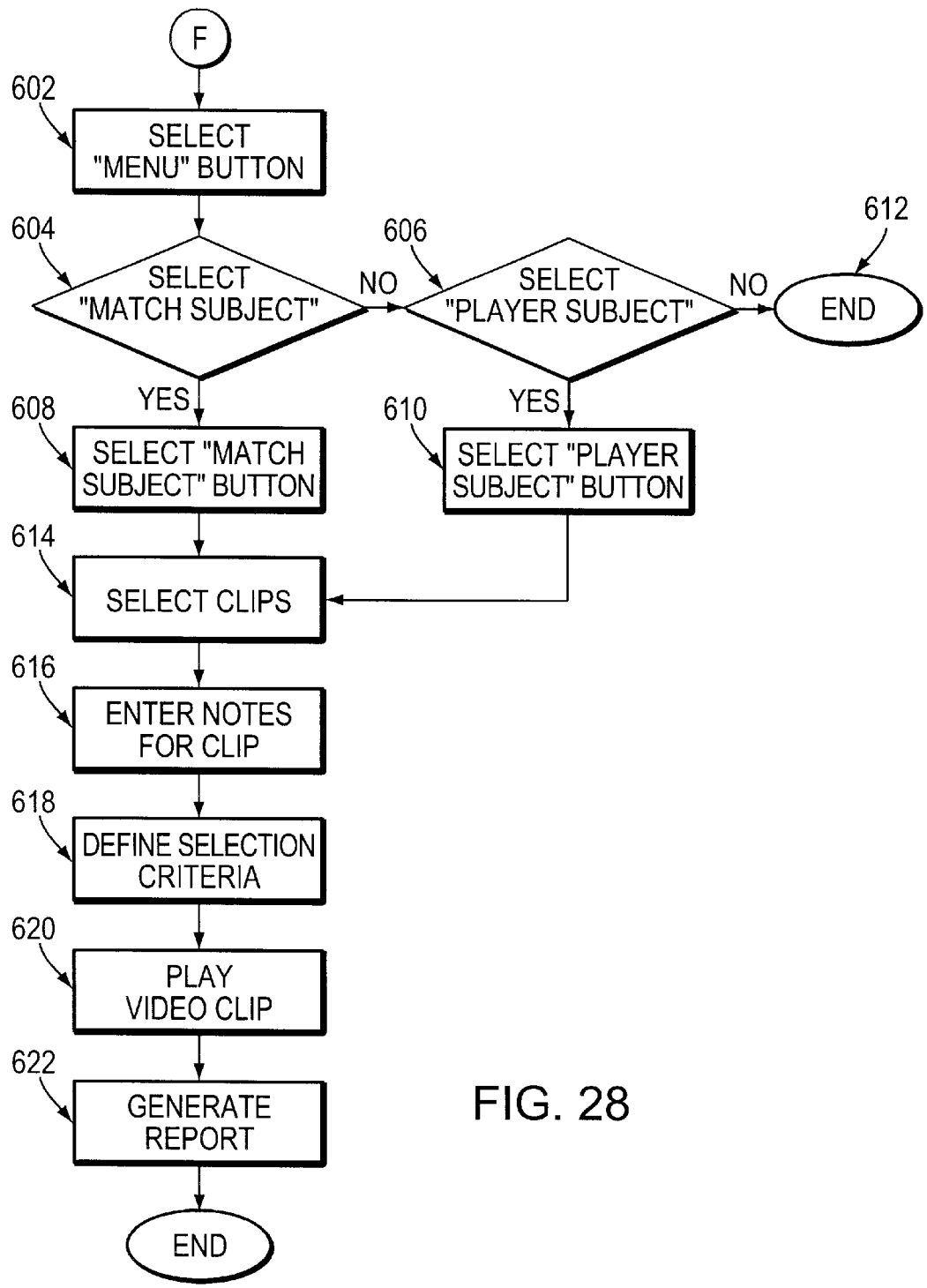
FIG. 28 is a flow chart for selecting match subjects and player subjects.
Figure 29:
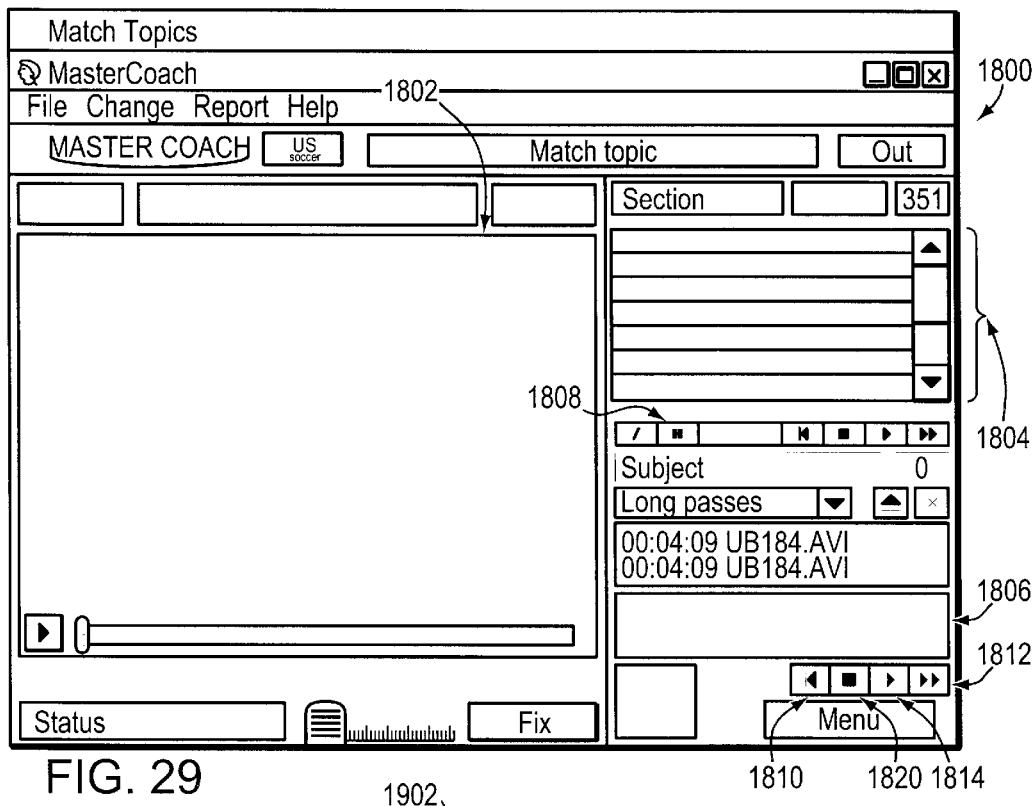
FIG. 29 is a match topics dialog box.

Referring to FIGS. 27, 28 and 29, after one or more video clips for a match has been captured, the user can use the "Match topics" dialog box 1800, as shown in FIG. 29, to select from the captured video clips for subsequent viewing on the video playback window 1802. The video clips can be sorted according to user-defined criteria, such as long passes or technical errors. The user-defined criteria is selected by choosing different selection criteria from Selection possibilities dialog box 1704 shown in FIG. 27. The user can view only those video clips which contains attributes associated with the chosen selection criteria which enables a user to isolate and view video clips having desired attributes.

Figure 30:
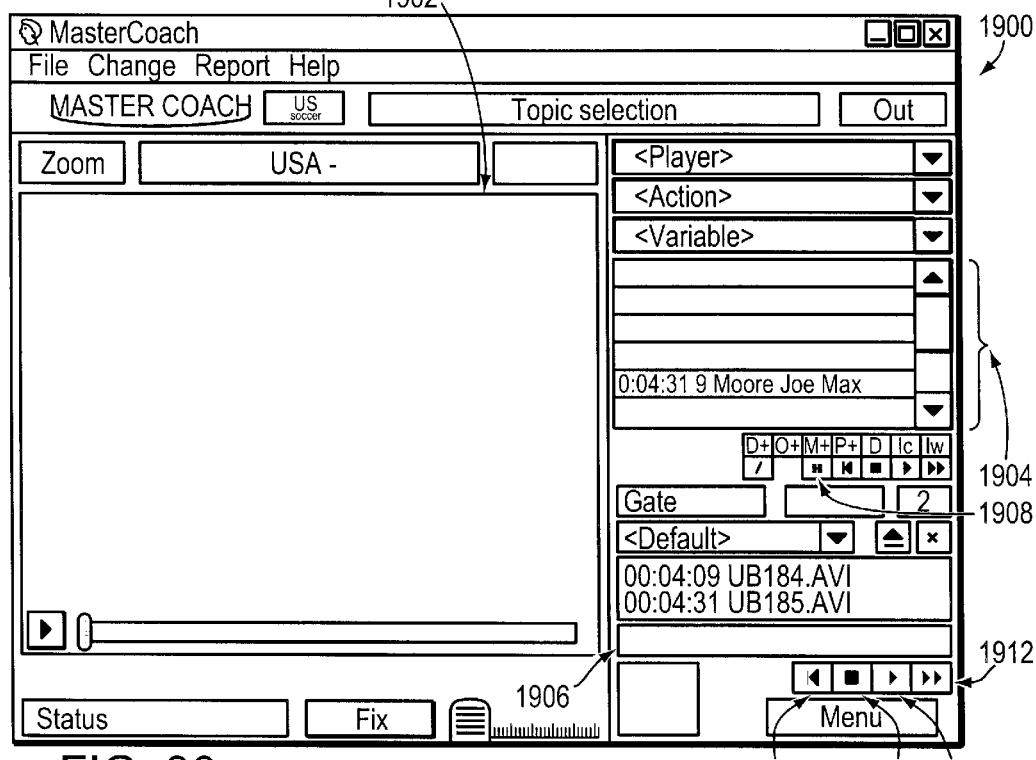
FIG. 30 is a topic selection dialog box.

Referring further to FIG. 30, after completion of player analysis (FIG. 23), the user can use the "topic selection" dialog box 1900 to select video clips containing particular players, which video clips can be subsequently viewed on the video playback window 1902. The particular selection can include video clips on the basis of variables such as players, actions, characteristics or a combination of all variables.

Referring to FIGS. 28, 29 and 30, the process steps for using the "Match topics" dialog box 1800 and/or the "Topic selection" dialog box 1900 comprises: selecting the "Menu" button 701 (FIG. 2(*b*) at step 602. At step 604, the user can elect to select a match subject by selecting the "Match subjects" button 712 (FIG. 2(*b*)), at step 608, to provide the user with the Match topics dialog box 1800 as shown in FIG. 29. At step 606, the user can elect to enter a player subject by selecting the "Player subjects" button 714 (FIG. 2(b)) at step 610 to provide the user with the Topic selection dialog box 1900 as shown in FIG. 30. At step 612, the user can end the analysis.

At step 614, the user can select clips from either list of video clips defined in FIGS. 29 or 30 which selected clips appear in selected clips list 1804 and/or 1904 respectively. The FIGS. 29 and 30 dialog boxes each contain a notes box 806 and 1906 respectively, so that at step 616, the user can enter any desired notes corresponding to selected video clips respectively contained in the clip lists 1804 and 1904. At step 618, the user can define selection criteria by selecting the double bar button 1808 as shown in FIG. 29 or 1908 as shown in FIG. 30 to provide the user with the "Selection possibilities" dialog box 1704 as shown in FIG. 27. The user can then define video clip selection criteria by directly selecting desired boxes from the Selection possibilities dialog box 1704. At step 620, and as shown in FIG. 29, the user can play the selected video clips in the video playback area 1802 by selecting the left arrow with a bar 1810; double right arrow 1812 or the single right arrow 1814, and the user can stop the video clip by selecting the square button 1816. Alternatively, at step 620, and as shown in FIG. 30, the user can play the selected video clips in the video playback area 1902 by selecting the left arrow with a bar 1910; double right arrow 1912 or the single right arrow 1914, and the user can stop the video clip by selecting the square button 1916. After completion of the above steps for analyzing video data, user can print out a report at step 622 and end processing at step 612.

There are many advantages to the present invention including a method and system that enables coaches to capture and store a plurality of video clips containing salient features of a particular sporting event or game. The captured and stored video clips can be further processed to assign user-defined criteria to the video clips. Subsequently, the captured video clips can be quickly accessed and viewed according to the user-defined criteria. Moreover, statistical reports can be generated based on user-defined criteria which has been assigned to the captured video clips.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method for processing video data stored in a database associated with a computer system, the method comprising the steps of:

capturing a plurality of video clips associated with at least one subject;

assigning a plurality of labels to the plurality of video clips, the plurality of labels being associated with a plurality of actions related to the at least one subject; and generating statistical data based on the plurality of labels assigned to the plurality of video clips;

wherein capturing a plurality of video clips comprises capturing a plurality of video clips associated with at least one subject in accordance with a predetermined video capture level;

wherein the step of capturing a plurality of video clips includes the steps of:

opening a predetermined capture level dialog box;

starting a video player for providing the video data; and selecting a button located on the predetermined capture level dialog box to capture the plurality of video clips;

wherein the method further includes the step of selecting one of a passing button, a counter button, a new control button, an A+ button, a + button and an H+ button from the predetermined capture level dialog box to label at least one of the plurality of video clips.

2. The method for processing video data of claim 1, wherein the method further includes the step of:

selecting one of a kick-off button, an offside button, a free kick button, a penalty button, a throw-in button, a corner button, a goal kick button, a kick by keeper button, a throw by keeper button and a drop ball button from the predetermined capture level dialog box to label at least one of the plurality of video clips.

3. The method for processing video data of claim 2, wherein the method further includes the step of:

selecting one of a to GK button, a BD button, a N.C. button, a + button, an H+ button, and an A+ button from the predetermined capture level dialog box to label at least one of the plurality of video clips.

4. A method for processing video data stored in a database associated with a computer system, the method comprising the steps of:

capturing a plurality of video clips associated with at least one subject;

assigning a plurality of labels to the plurality of video clips, the plurality of labels being associated with a plurality of actions related to the at least one subject;

generating statistical data based on the plurality of labels assigned to the plurality of video clips; and evaluating a scoring chance of the at least one subject associated with the plurality of video clips;

wherein the step of evaluating scoring chances of the at least one subject includes the steps of:

viewing at least one of the plurality of video clips on a display; and associating a predetermined scoring chance classification label with the at least one of the plurality of video clips; and wherein associating a predetermined scoring chance classification label with the at least one of the plurality of video clips includes the step of:

selecting one of a goal button, a great chance button, an average chance button, and a half chance button.

5. The method for processing video data of claim 4, further including the step of:

selecting one of a set play attack button, a set poss attack button, and a long attack button.

6. A method for processing video data stored in a database associated with a computer system, the method comprising the steps of:

capturing a plurality of video clips associated with at least one subject;

assigning a plurality of labels to the plurality of video clips, the plurality of labels being associated with a plurality of actions related to the at least one subject;

generating statistical data based on the plurality of labels assigned to the plurality of video clips; and evaluating performance of the at least one subject associated with the plurality of video clips;
wherein the step of evaluating performance of the at least one subject includes the steps of:
   viewing at least one of the plurality of video clips on a display;
   pausing the at least one of the plurality of video clips; and
   labeling a player action associated with the at least one of the plurality of video clips; and wherein labeling a player action further includes the step of:
   selecting a player from a predefined player list; and
   selecting one of a D+ button, an O+ button, an M− button, a P− button, a D− button, an IC button and an IW button from a player analysis dialog box to label the player action.

\* \* \* \* \*

UNITED STATES PATENT AND TRADEMARK OFFICE
CERTIFICATE OF CORRECTION

PATENT NO. : 6,545,689 B1
DATED : April 8, 2003
INVENTOR(S) : Jan Tunli

It is certified that error appears in the above-identified patent and that said Letters Patent is hereby corrected as shown below:

Column 8,
Line 66, after the "." but before the word "step", insert -- At --.

Column 11,
Line 9, delete "806", insert -- 1806 --.

Signed and Sealed this

Fifth Day of August, 2003

JAMES E. ROGAN
*Director of the United States Patent and Trademark Office*